United States Patent [19]
Moseley et al.

[11] Patent Number: 6,046,849
[45] Date of Patent: Apr. 4, 2000

[54] PARALLAX BARRIER, DISPLAY, PASSIVE POLARISATION MODULATING OPTICAL ELEMENT AND METHOD OF MAKING SUCH AN ELEMENT

[75] Inventors: Richard Robert Moseley, Bourton-on-the-Water; Graham John Woodgate, Henley-on-Thames; Adrian Marc Simon Jacobs, Headington; Jonathan Harrold, Sandford-on-Thames; David Ezra, Wallingford, all of United Kingdom

[73] Assignee: Sharp Kabushiki Kaisha, Osaka, Japan

[21] Appl. No.: 08/928,891

[22] Filed: Sep. 12, 1997

[30] Foreign Application Priority Data

Sep. 12, 1996 [GB] United Kingdom .................... 9619097
Feb. 4, 1997 [GB] United Kingdom .................... 9702259
Jul. 3, 1997 [GB] United Kingdom .................... 9713985

[51] Int. Cl.[7] .................................................. G02B 27/26
[52] U.S. Cl. ......................... 359/465; 359/464; 359/462; 359/501; 348/57; 348/58
[58] Field of Search .................................... 359/464, 465, 359/483, 485, 489, 462, 501; 349/129, 15; 348/57, 58

[56] References Cited

U.S. PATENT DOCUMENTS

| | | | |
|---|---|---|---|
| 2,631,496 | 3/1953 | Rehorn | 88/29 |
| 2,647,440 | 8/1953 | Rehorn | 88/65 |
| 5,235,449 | 8/1993 | Imazeki et al. | 359/63 |
| 5,264,964 | 11/1993 | Faris | 359/465 |
| 5,327,285 | 7/1994 | Faris | 359/483 |
| 5,532,852 | 7/1996 | Kalmanash | 359/73 |
| 5,537,144 | 7/1996 | Faris | 348/58 |
| 5,822,117 | 10/1998 | Kleinberger et al. | 359/465 |
| 5,825,541 | 10/1998 | Imai | 359/464 |
| 5,831,698 | 11/1998 | Depp et al. | 349/64 |

FOREIGN PATENT DOCUMENTS

| | | |
|---|---|---|
| 0540137 | 5/1993 | European Pat. Off. . |
| 0625861 | 11/1994 | European Pat. Off. . |
| 0689084 | 12/1995 | European Pat. Off. . |
| 0701149 | 3/1996 | European Pat. Off. . |
| 0721131 | 7/1996 | European Pat. Off. . |
| 0721132 | 7/1996 | European Pat. Off. . |
| 0724176 | 7/1996 | European Pat. Off. . |
| 0726482 | 8/1996 | European Pat. Off. . |
| 63-158525 | 7/1988 | Japan . |
| 2145897 | 4/1988 | United Kingdom . |
| 2252175 | 7/1992 | United Kingdom . |
| 9424601 | 10/1994 | WIPO . |

OTHER PUBLICATIONS

European Search Report related to European Patent Application No. 97307085.7 dated Oct. 23, 1998.
Search Report for GB 9619097.0; Dated Dec. 12, 1996.
Search Report for GB 9702259.4; Dated Apr. 21, 1997.
Search Report for GB 9713985.1; Dated Jul. 31, 1997.

(List continued on next page.)

*Primary Examiner*—Cassandra Spyrou
*Assistant Examiner*—Craig Curtis
*Attorney, Agent, or Firm*—Renner, Otto, Boisselle & Sklar

[57] ABSTRACT

A parallax barrier includes a polarisation modifying layer having aperture regions, for supplying light of a second polarisation when receiving light of a first polarisation, separated by barrier regions, for supplying light of a third polarisation different from the second polarisation when receiving light of the first polarisation, and a polariser selectively operable in a first mode and a second mode. At least one of the aperture regions and the barrier regions alters the polarisation of light passing therethrough. The polariser passes light of the second polarisation and blocks light of the third polarisation in the first mode and passes light of the third polarisation in the second mode.

22 Claims, 33 Drawing Sheets

OTHER PUBLICATIONS

S. Pancharatnam, The Proceedings Of The Indian Academy Of Sciences, vol. XLI, No. 4, Sec. A, pp. 130–136, 1995, "Achromatic Combinations Of Birefringent Plates".

S.M. Faris; SPIE, Vo. 2177, pp. 180–195, 1994, "Novel 3D Stereoscopic Imaging Technology".

J.B. Eichenlaub, SPIE, vol. 2177, pp. 4–15, 1994, "An Autostereoscopic Display With High Brightness and Power Efficiency".

M. Schadt et al., J. J. Appl. Phys., vol. 31, Part I, No. 7, pp. 2155–2164, "Surface–Induced Parallel Alignment Of Liquid Crystals by Linearly Polymerized Photopolymers".

E. Nakayama et al., Proc. Third Internal Display Workshops, vol. 2, pp. 453–456, 1996, "2–D/3–D Compatible LC Display Without Special Glasses".

D.J. Broer, SID 95 Digest, pp. 165–168, 1995, "Invited Paper: Molecular Architectures in Thin Plastic Films By In–Situ Photopolymerization of Reactive Liquid Crystals".

J. Chen et al., SID 95 Digest, pp. 865–868, 1995, "Four Domain TN–LCD Fabricated By Reverse Rubbing OR Double Evaporation".

Search Report for Application No. 97307085.7; Dated Dec. 15, 1998.

M. Schadt et al.; Japanese Journal of Applied Physics, vol. 34, No. 6A, Jun. 1, 1995, pp. 3240–3249, "Photo–Generation of Linearly Polymerized Liquid Crystal Aligning Layers Comprising Novel, Integrated Optically . . . ".

M. Schadt et al.; Japanese Journal of Applied Physics, vol. 34, No. 6B, Jun. 15, 1995, pp. L764–L767, "Photo–Induced Alignment and Patterning of Hybrid Liquid Crystalline Polymer Films on Single Substrates".

T. Kaneko et al.; vol. 32, No. 2, Feb. 1, 1980, pp. 220–224, "Liquid Crystal Polarization Rotator: Optical Element for Intermodulation Spatial–Bandwidth Reduction in Holography".

FIG. 13 Half wave retarder between polarisers

ALIGNMENT
LAYER
60

61
SUBSTRATE

UNPOLYMERISED DOPED
RETARDER LAYER
67

MASK
19

67

68
TWISTED
RETARDER

ISOTROPIC
MATERIAL

66

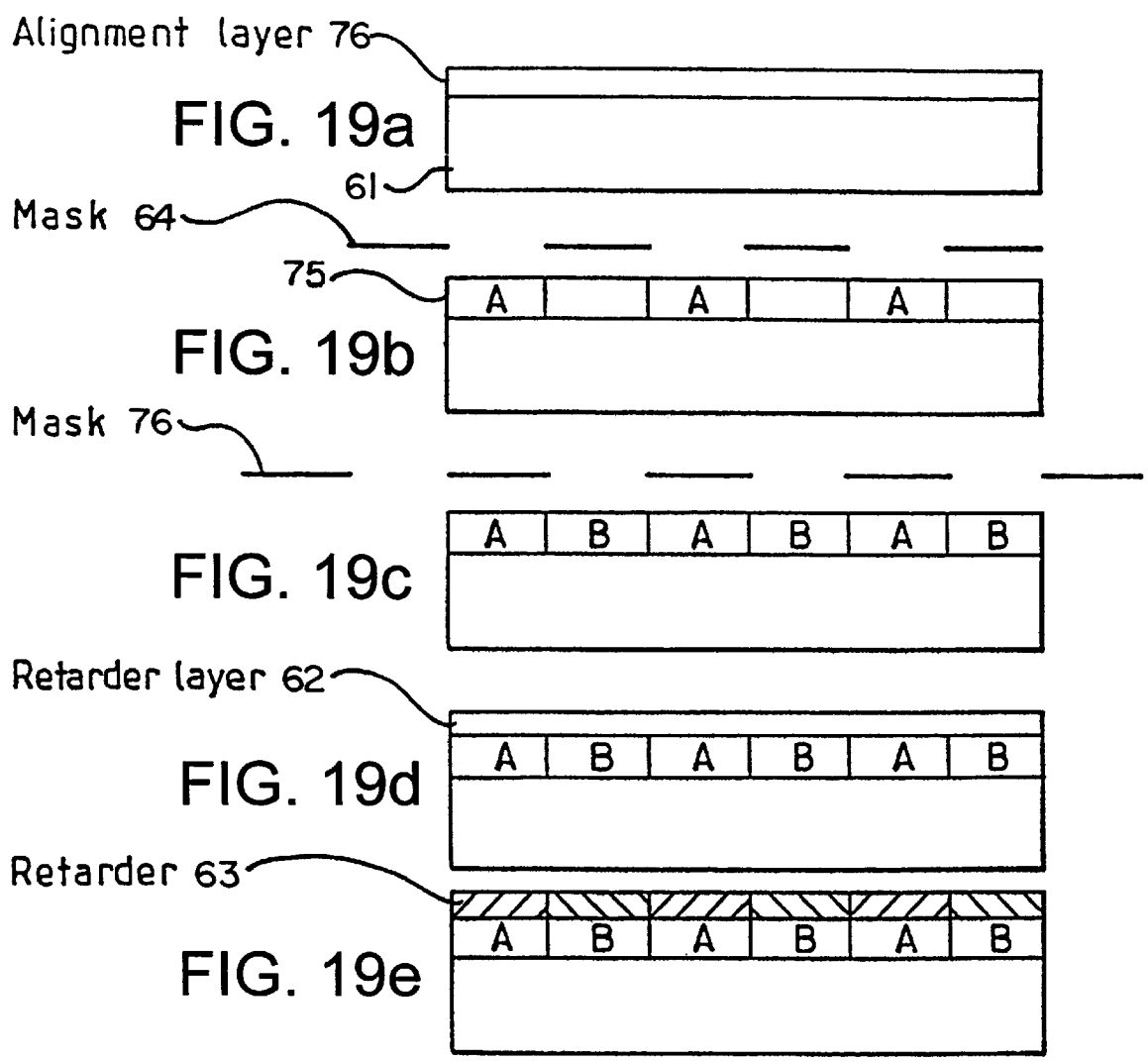

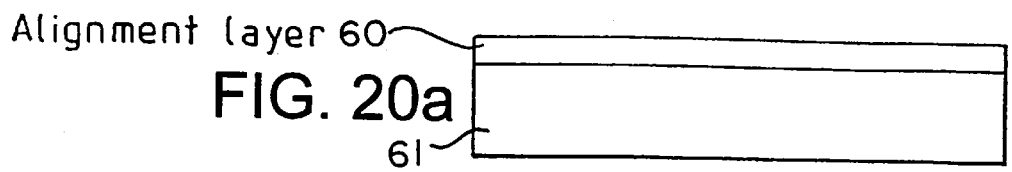
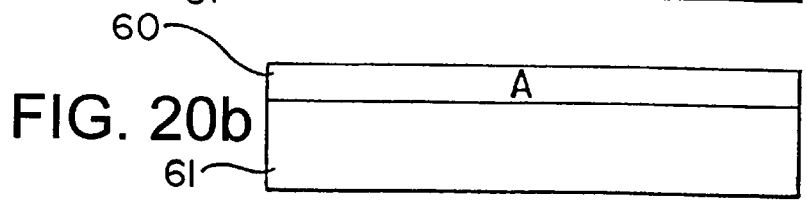
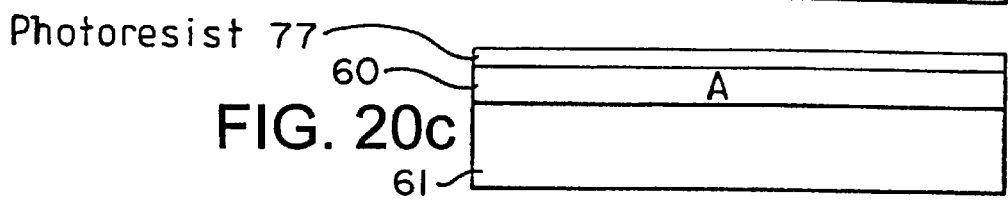
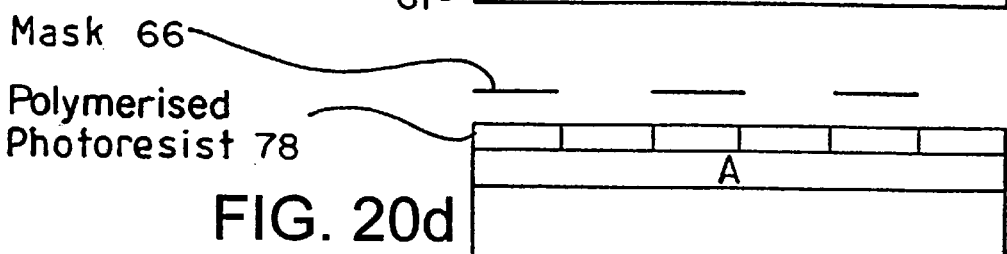
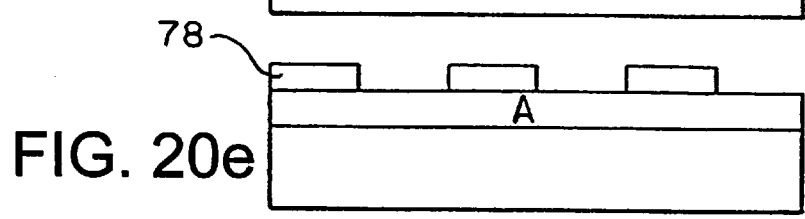
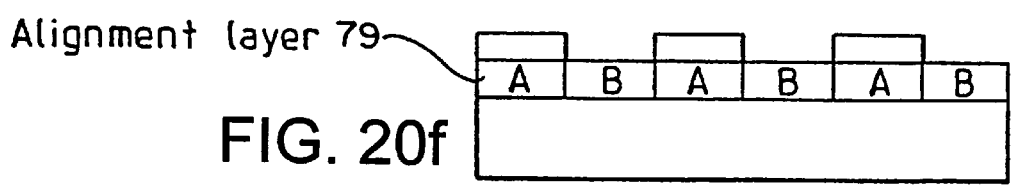
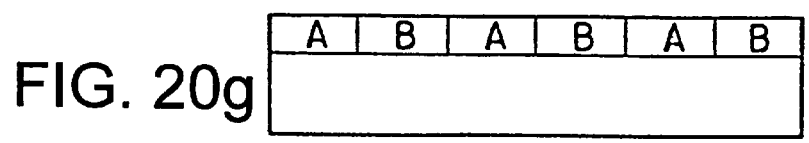
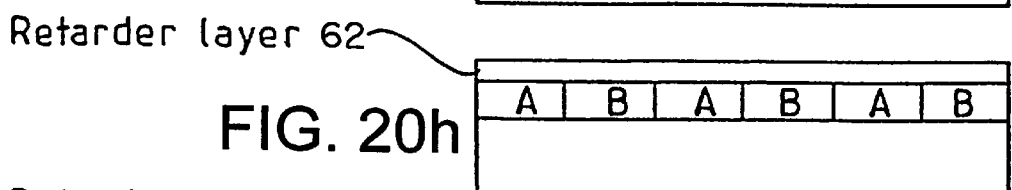
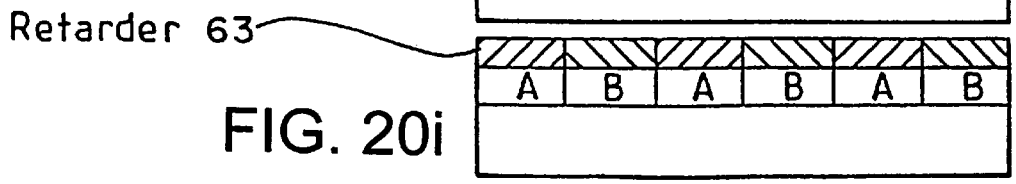

FIG. 33  Half wave retarder between polarisers

Mask appearance 20
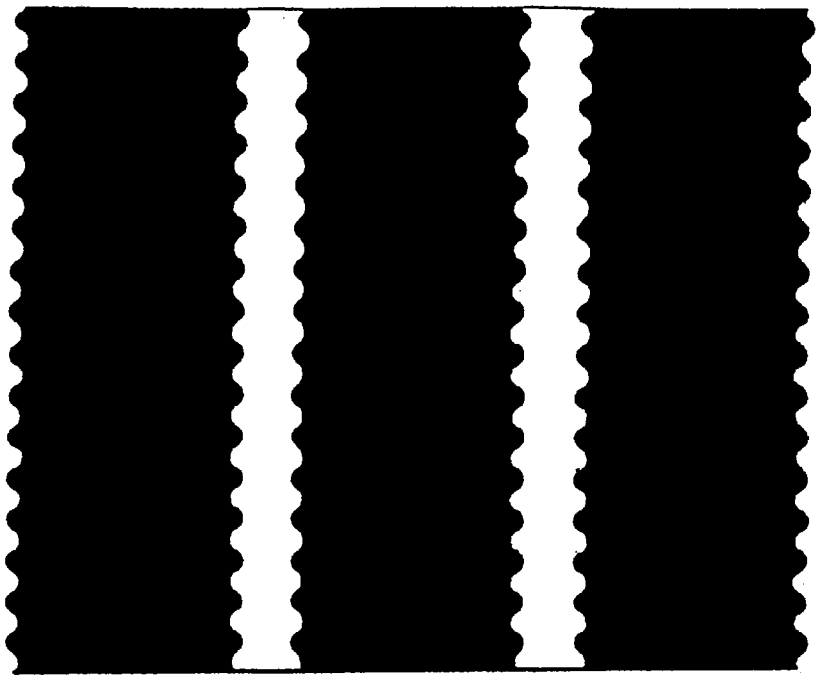
Alignment layer orientation 21
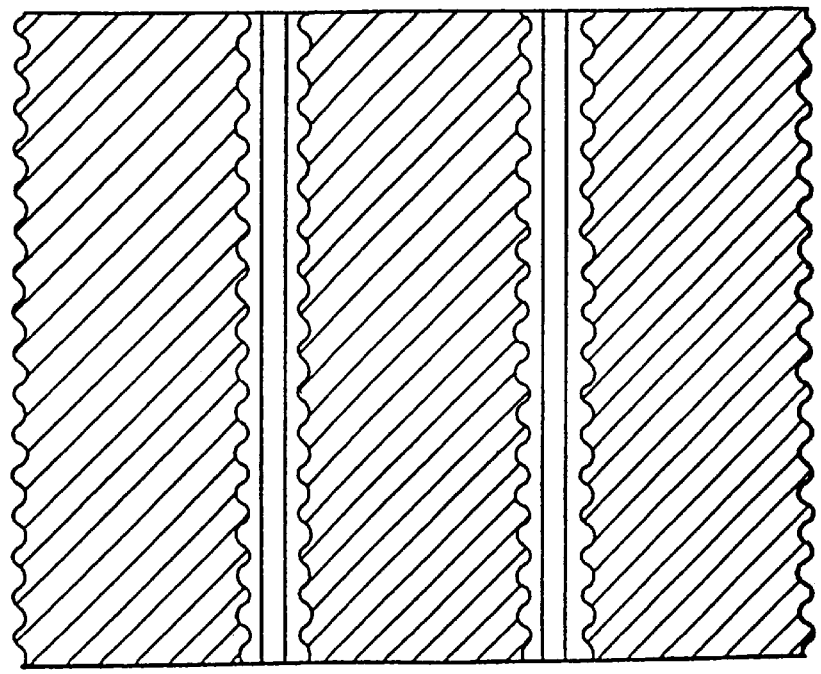
FIG. 35

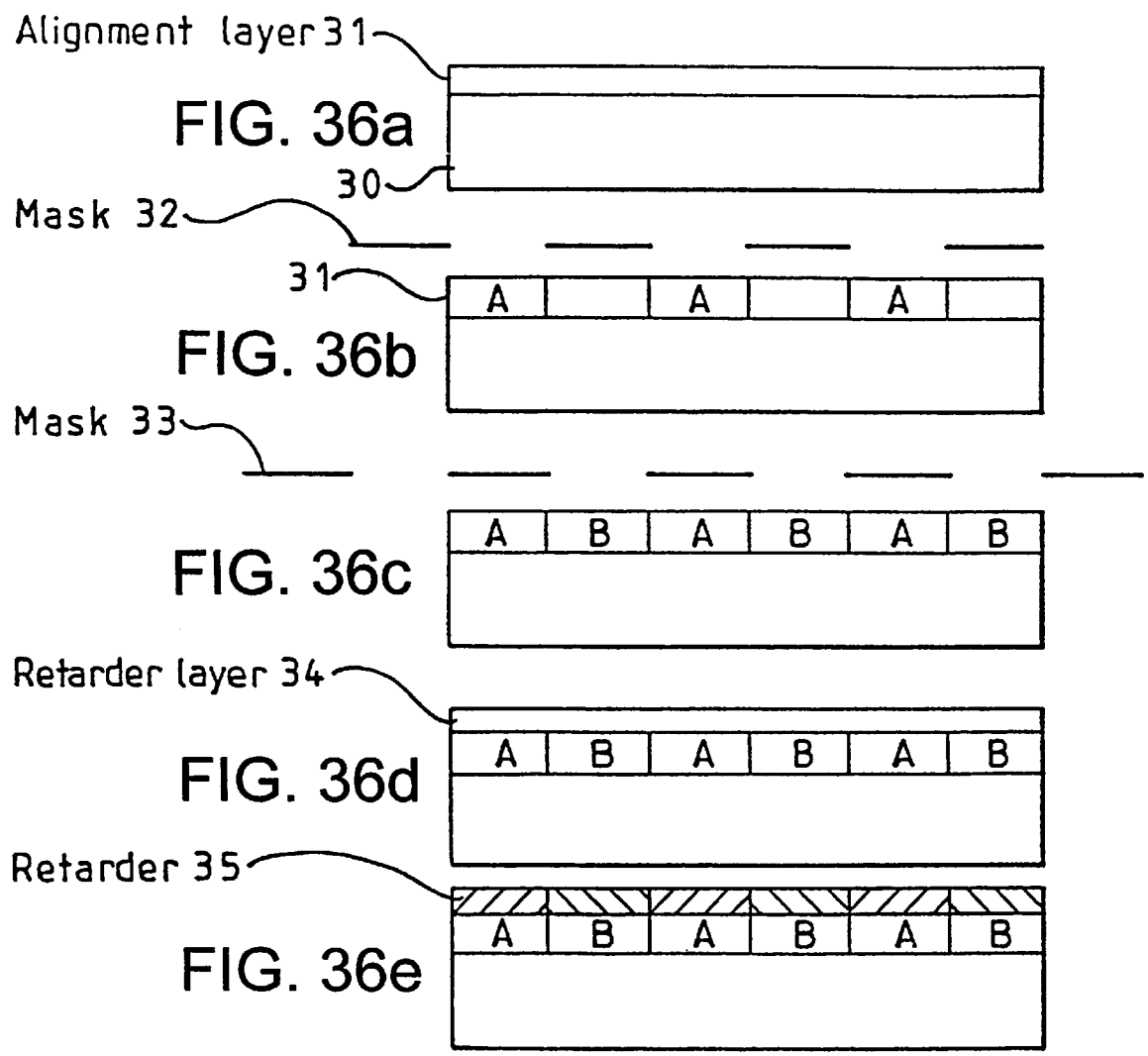

PARALLAX BARRIER, DISPLAY, PASSIVE POLARISATION MODULATING OPTICAL ELEMENT AND METHOD OF MAKING SUCH AN ELEMENT

TECHNICAL FIELD OF THE INVENTION

The present invention relates to a passive polarisation modulating optical element and to an optical device including such an element. The present invention also relates to a method of making a passive polarisation modulating optical element. Such an element may be used in three dimensional (3D) displays, for instance of the autostereoscopic type. Such displays may be used in games apparatuses, computer monitors, laptop displays, work stations and professional imaging, for instance for medical, design or architectural use.

The present invention relates to a parallax barrier and to a display. Such displays may be used as switchable two dimensional (2D)/three dimensional (3D) displays and may be used in games apparatuses, computer monitors, lap top displays, work stations and professional imaging, for instance for medical, design or architectural use.

DESCRIPTION OF THE RELATED ART

In normal vision, the two human eyes perceive views of the world from two different perspectives due to their spatial separation within the head. These two perspectives are then used by the brain to assess the distance to various objects in a scene. In order to provide a display which effectively displays a 3 D image, it is necessary to recreate this situation and supply a so-called "stereoscopic pair" of images, one to each eye of an observer.

Most 3 D displays may be classified into two types depending on the technique used to supply the different views to the eyes. Stereoscopic displays typically display both of the images over a wide viewing area. However, each of the views is encoded, for instance by colour, polarisation state or time of display, so that a filter system of glasses worn by the observer attempts to separate the views to let each eye see only the view that is intended for it.

Autostereoscopic displays require no viewing aids to be worn by the observer. Instead, the two views are only visible from defined regions of space. The region of space in which an image is visible across the whole of the display active area is termed a "viewing region". If the observer is situated such that one eye is in one viewing region and the other eye is in the other viewing region, then a correct set of views is seen and a 3D image is perceived.

For autostereoscopic displays of the "flat panel" type, the viewing regions are formed by a combination of the picture element (pixel) structure of the display and an optical element, generically termed a parallax optic. An example of such an optic is a parallax barrier. This element is a screen with vertical transmissive slits separated by opaque regions. A display of this type is illustrated in FIG. 1 of the accompanying drawings. A spatial light modulator (SLM) 1 of the liquid crystal type comprises glass substrates 2 between which are disposed a liquid crystal layer together with associated electrodes and alignment layers. A backlight 3 illuminates the SLM 1 from behind and a parallax barrier 4 is disposed on the front surface of the SLM 1.

The SLM 1 comprises a 2D array of pixel apertures with the pixels arranged as columns as shown at 5 separated by gaps 6. The parallax barrier 1 has vertically extending slits 7 with a horizontal pitch close to an integer multiple of the horizontal pitch of the pixel columns 5 so that groups of columns of pixels are associated with each slit. As illustrated in FIG. 1, three pixel columns labelled columns 1, 2 and 3 are associated with each slit 7 of the parallax barrier 4.

The function of the parallax optic such as the parallax barrier 4 is to restrict the light transmitted through the pixels to certain output angles. This restriction defines the angle of view of each of the pixel columns behind the associated slit. The angular range of view of each pixel is determined by the pixel width and the separation between planes containing the pixels and the parallax optic. As shown in FIG. 1, the three columns 5 associated with each slit 7 are visible in respective viewing windows.

FIG. 2 of the accompanying drawings illustrates the angular zones of light created from an SLM 1 and a parallax barrier 4 where the parallax barrier slits have a horizontal pitch equal to an exact integer multiple of the pixel column pitch. In this case, the angular zones coming from different locations across the display surface intermix and a pure zone of view for image 1 or image 2 does not exist. Thus, each eye of an observer will not see a single image across the whole of the display but instead will see slices of different images at different regions on the display surface. In order to overcome this problem, the pitch of the parallax optic is reduced slightly so that the angular zones converge at a predetermined plane, generally known as the "window plane", in front of the display. This change in the parallax optic pitch is termed "viewpoint correction" and is illustrated in FIG. 3 of the accompanying drawings. The window plane is shown at 8 and the resulting substantially kite shaped view regions are shown at 9 and 10. Provided the left and right eyes of the observer remain in the viewing regions 9 and 10, respectively, each eye will see the single image intended for it across the whole of the display so that the observer will perceive the 3D effect.

The window plane 8 defines the optimum viewing distance of the display. An observer whose eyes are located in this plane receives the best performance of the display. As the eyes move laterally in this plane, the image on the display remains until the eyes reach the edge of the viewing regions 9 and 10, whereupon the whole display swiftly changes to the next image as one eye moves into the adjacent viewing region. The line of the window plane within each viewing region is generally termed a "viewing window".

FIG. 4 of the accompanying drawings illustrates an autostereoscopic display which differs from that shown in FIG. 1 in that the parallax barrier 4 is disposed on the rear surface of the SLM 1. This arrangement has the advantage that the barrier 4 is disposed behind the SLM 1 away from possible damage. Also, the light efficiency of the display may be improved by making the opaque parts of the rear surface of the parallax barrier 4 reflective so as to recycle light which is not incident on the slits 7.

A switchable diffuser 11 is shown between the parallax barrier 4 and the SLM 1. Such a diffuser may comprise a polymer-dispersed liquid crystal which is switchable between a low scattering or substantially clear state and a highly scattering state. In the low scattering state, the display operates as described hereinbefore as an autostereoscopic 3D display. When the diffuser is switched to the highly scattering state, light rays are deflected on passing through the diffuser and form an even or "Lambertian" distribution which "washes out" the effect of the parallax barrier 4 and so destroys the creation of viewing regions. In this mode, the display therefore acts as a conventional 2D display with the full spatial resolution of the SLM 1 being available for displaying 2D images.

In the displays described hereinbefore, the basic principle is that a subset of the total number of pixels of the SLM 1 is visible to each eye at any one time. Thus, each of the views represented in the viewing regions uses a fraction of the total resolution of the SLM 1. In a typical two view spatially multiplexed autostereoscopic display, each eye perceives an image of only half the total resolution. For a three view system, the resolution in each eye is only one third. The representation of complex small characters, such as text and details within images, may therefore by adversely affected. It is desirable to include in the display some means for disabling or overcoming the parallax imaging system so that the full resolution of the SLM 1 is visible to each eye for the display of detailed 2D information. Although the switchable diffuser 11 shown in FIG. 4 provides such switching, this adds to the cost and complexity of the display.

U.S. Pat. No. 2,631,496 discloses an autostereoscopic display based on a single picture in which a parallax element is provided by a polariser element having alternate stripes of orthogonally oriented polariser. The polariser element co-operates with an image in which the left and right views are encoded with orthogonal polarisations in vertical columns. The encoding swaps for every image strip column. The polariser element thus acts in a similar manner to a parallax barrier but is such that the mark/space ratio i.e. the ratio of the width of each effective slit to each effective opaque region, is substantially equal to 1. This results in relatively high cross talk and poor viewing freedom for the observer. Such an arrangement does not permit a full resolution 2D viewing mode to be achieved without image artefacts.

Proc. SPIE vol. 2177, pp 181 "Novel 3D Stereoscopic Imaging Technology", S. M. Faris, 1994 discloses a display which may operated stereoscopically or autostereoscopically using external micropolarisers. In particular, two micropolariser sheets are disposed above the spatially multiplexed image and are movable to switch between autostereoscopic and stereoscopic viewing. Such an arrangement cannot be operated to provide a high resolution 2D viewing mode.

E. Nakayama et al, "2D/3D Compatible LC Display without Special Glasses", Proc. third Internal Display Workshops vol. 2, pp 453–456, 1996 discloses a 3D display of the rear parallax barrier type similar to that shown in FIG. 4 of the accompanying drawings. A switchable diffuser is disposed between the parallax barrier and the SLM in the same way as illustrated in FIG. 4 to allow the display to be operated in a full resolution 2D mode.

In order to destroy the formation of viewing windows for the 2D mode, scattering by the diffuser must completely remove the visibility of the parallax barrier to the observer. However, in order for the autostereoscopic 3D mode to be effective, the gaps between the slits of the parallax barrier must provide strong extinction of light. These requirements are mutually incompatible and can be overcome only by very strong back-scattering in the switchable diffuser, which reduces the display transmission substantially, or by making the parallax barrier reflective on the observer side, thus damaging the 3D image. Further, although a rear reflective layer may be applied to the parallax barrier so as to recycle light and improve brightness, all of the light received by the observer has to pass through the slits of the parallax barrier so that display brightness is degraded in the 2D mode. Typically, the mark space ratio of the parallax barrier would be 2:1 so that only one third of the light from the backlight is transmitted through the display. The reflective layer may improve this but would not restore the display to full brightness. Further, back scatter in the switchable diffuser would reduce the display brightness in the 2D mode. If the switchable diffuser is designed for strong backscatter in the high diffusion mode of operation, it is difficult to achieve the very low levels of diffusion necessary in the low diffusion mode to ensure that the 3D display device does not suffer from increased cross talk.

J. B. Eichenlaub, Proc. SPIE 2177, pp 4–15, "An Autostereoscopic Display with High Brightness and Power Efficiency", 1994 discloses a 3D display of the rear parallax barrier type which could be switched to a full resolution 2D mode using a switchable diffuser or an array of lamps. However, such an arrangement has the disadvantages described hereinbefore. Furthermore, the optical system of such a display is not compatible with the slim design of current flat-panel display systems wherein the backlight structure is less than 1 cm thick.

U.S. Pat. No. 5,264,964 discloses a passive display of the rear parallax barrier type. The display is switchable between stereoscopic and autostereoscopic modes of viewing. The rear parallax barrier comprises two micropolarisers with a nematic liquid crystal layer there between. The micropolarisers have aligned polarising and non-polarising regions such that, when the liquid crystal is in its inactive state and has not effect on the polarisation of light, polarising glasses have to be worn in order to view the image stereoscopically. When the liquid crystal layer is in its active state, it rotates the polarisation of light through 90°. The aligned polarising regions of the micropolarisers then block light so that a rear parallax barrier is formed and the image can be viewed autostereoscopically.

When the display is in the 2D mode, light enters the liquid crystal layer from both polarised and unpolarised regions of the input micropolariser. The polarised regions have a lower transmissivity than the unpolarised regions and this causes Moire effects in the illumination of the display. This results in illumination stripes in the display and flickering illumination as the observer moves. The 2D image appearance will therefore be very poor. Further, image pixels associated with one polarisation direction do not transmit light from barrier regions of the orthogonal polarising direction. This causes further illumination non-uniformities and causes obstruction of vertical pixel lines.

In the 3D mode of this device, opaque regions are coloured and transmit a significant quantity of light because of problems of the polarisation change varying with the wavelength of the incident light. The polarisation is rotated by 90° at only one "design" wavelength. At other wavelengths, the rotation is approximate. This results in significant cross talk levels which give poor 3D Image quality. Also, the mark/space ratio of the barrier is 1:1 which results in limited viewing freedom and high levels of cross talk.

"Molecular architectures in thin plastic film by in-situ photopolymerisation of reactive liquid crystals" Philips SID 95 Digest discloses a method of making patterned optical waveplates.

"Surface induced parallel alignment of liquid crystals by linearly polymerised photopolymers" Schadt et al Japanese Journal of Applied Physics, vol 31, 1992, pp 2155 discloses a technique based on the photopolymerisation of liquid crystals obtained by crosslinking polyvinylmethoxycinnamate using polarised light.

EP 0 689 084 discloses the use of reactive mesogen layers as optical elements and alignment surfaces.

SUMMARY OF THE INVENTION

U.S. Pat. No. 5,537,144 and U.S. Pat. No. 5,327,285 disclose photolithographic techniques of patterning polarisers or retarders. An array of waveplates is generated by bleaching a stretched film of PVA through a photoresist mask in a hot humid atmosphere or with water-based bleachers. This alters the material properties so that the retardance properties of the material are selectively destroyed in certain regions. Thus, such a technique may be used to provide a single layer element in which some regions act as retarders with the optic axes parallel to each other and other regions have substantially zero retardance.

"Four domain TNCLD fabricated by reverse rubbing or double evaporation" Chen et al SID 95 Digest page 865 discloses the use of a technique involving double-rubbing of an alignment layer in an active liquid crystal device (LCD). The liquid crystal alignment direction varies within each pixel to enable improved viewing angle performance of the device.

According to a first aspect of the invention, there is provided a parallax barrier characterised by comprising: a polarisation modifying layer having aperture regions, for supplying light of a second polarisation when receiving light of a first polarisation, separated by barrier regions, for supplying light of a third polarisation different from the second polarisation when receiving light of the first polarisation, at least one of the aperture regions and the barrier regions altering the polarisation of light passing therethrough; and a polariser selectively operable in a first mode to pass light of the second polarisation and to block light of the third polarisation and in a second mode to pass light of the third polarisations. Such a parallax barrier can therefore be operated in a parallax barrier mode or in a non-barrier mode. When illuminated by light of the first polarisation, the non-barrier mode permits substantially all of the light to be transmitted so that, when used in a 3D autostereoscopic display, a full resolution 2D mode of high brightness can be provided.

The aperture regions may comprise parallel elongate slit regions.

The polariser may be a uniform polariser.

The third polarisation may be orthogonal to the second polarisation.

The first, second and third polarisations may be linear polarisations. The aperture regions may be arranged to rotate the polarisation of light and the barrier regions may be arranged not to rotate the polarisation of light so that the third polarisation is the same as the first polarisation. Such an arrangement allows the barrier regions to have maximum achromatic extinction of light when the barrier is used in barrier mode.

The aperture regions may comprise retarders. The aperture regions may comprise half waveplates. As an alternative, the aperture regions may comprise polarisation rotation guides.

The polarisation modifying layer may comprise a half waveplate, the aperture regions may have optic axes aligned at ±substantially 45° to the first polarisation, and the barrier regions may have optic axes aligned substantially parallel to the first polarisation.

The polariser may pass light of the second polarisation in the second mode.

The polariser may be removable from a light path through the polarisation modifying layer in the second mode. The polariser does not have to be aligned with great accuracy in order for the barrier mode to be effective. In particular, it is merely necessary for the polariser to cover the polarisation modifying layer and to be reasonably accurately aligned rotationally about an axis substantially normal to the layer. Thus, removal of the polariser permits the non-barrier mode of operation and relatively simple and inexpensive alignment means may be provided for aligning the polariser in the barrier mode.

The polariser may comprise glasses to be worn by an observer in the first mode.

The polariser may be rotatable through substantially ° an axis substantially perpendicular to the polarisation modifying layer between first and second positions for operation in the first and second modes, respectively.

The polariser may comprise a polarising layer and a retarder layer which is switchable between a non-retarding mode and a retarding mode providing a quarter wave of retardation.

The polariser may comprise a polarising layer and a switchable diffuser having a diffusing depolarising mode and a non-diffusing non-depolarising mode. The diffuser may be disposed between the polarising layer and the polarisation modifying layer. As an alternative, the polarisation modifying layer may be disposed between the polarising layer and the diffuser.

The barrier may comprise: a first quarter waveplate disposed between the polarisation modifying layer and the polariser and attached to the polarisation modifying layer; and a second quarter waveplate disposed between the first quarter waveplate and the polariser and attached to the polariser, the first and second quarter waveplates having substantially orthogonal optical axes. The quarter waveplates between the polarisation modifying layer and the polariser convert light to and from circular polarisation so that rotational alignment of the polariser relative to the polarisation modifying layer may be further relaxed.

According to a second aspect of the invention, there is provided a display comprising a barrier according to the first aspect of the invention and a spatial light modulator for supplying light of the first polarisation to the polarisation modifying layer.

The spatial light modulator may be a light emissive device, such as an electroluminescent display. As an alternative, the spatial light modulator may provide selective attenuation of light and may be associated with a light source. The spatial light modulator may comprise a liquid crystal device.

According to a third aspect of the invention, there is provided a display comprising a barrier according to the first aspect of the invention, a light source for supplying light to the polariser, and a spatial light modulator having an input polariser for passing light from the aperture regions.

The spatial light modulator may comprise a liquid crystal device.

According to a fourth aspect of the invention, there is provided a display comprising: a light source selectively operable in a first mode for supplying light of a first polarisation and a second mode for supplying unpolarised light; a polarisation modifying layer having aperture regions, for supplying light of a second polarisation when receiving light of the first polarisation, separated by barrier regions, for supplying light of a third polarisation different from the second polarisation when receiving light of the first polarisation; and a spatial light modulator having an input polariser for passing light of the second polarisation and for blocking light of the third polarisation.

The aperture regions may comprise parallel elongate slit regions.

The light source may comprise a polarised light source operable in the first mode and an unpolarised light source operable in the second mode. The polarised light source may comprise at least one first light emitting device arranged to supply light through a polariser to a first light guide. The unpolarised light source may comprise at least one second light emitting device arranged to supply light to a second light guide and one of the first and second light guides may be arranged to supply light through the other of the first and second light guides.

The light source may comprise at least one light emitting device, a light guide, and a polariser disposed in an optical path between the or each light emitting device and the light guide in the first mode and outside the optical path in the second mode.

According to a fifth aspect of the invention, there is provided a display comprising: a polarisation modifying layer having aperture regions, for supplying light of a second polarisation when receiving light of a first polarisation, separated by barrier regions, for supplying light of a third polarisation different from the second polarisation when receiving light of the first polarisation; a spatial light modulator having an input polariser for passing light of the second polarisation and for blocking light of the third polarisation; a light source; a mask having polarising regions, for supplying light of the first polarisation from the light source, and non-polarising regions, for transmitting light from the light source; and a parallax optic co-operating with the mask to direct light from the polarising regions through the spatial light modulator to a first viewing region and to direct light from the non-polarising regions through the spatial light modulator to a second viewing region.

The mask may be movable relative to the parallax optic for moving the first and second viewing regions.

The parallax optic may comprise an array of parallax generating elements.

The aperture regions may comprise parallel elongate slit regions.

Each of the parallax generating elements may be optically cylindrical with an axis substantially orthogonal to the slit regions.

The array may comprise a lenticular screen. As an alternative, the array may comprise a parallax barrier.

The polarising and non-polarising regions may comprise laterally extending strips.

The mask may further comprise opaque regions at least partially separating the polarising regions from the non-polarising regions.

The third polarisation may be orthogonal to the second polarisation.

The first, second and third polarisations may be linear polarisations. The aperture regions may be arranged to rotate the polarisation of light and the barrier regions may be arranged not to rotate the polarisation of light so that the third polarisation is the same as the first polarisation.

The aperture regions may comprise retarders.

The aperture regions may comprise half waveplates.

The aperture regions may comprise polarisation rotation guides.

It is thus possible to provide a display, for instance of the flat panel type which is operable in a wide view full resolution 2D mode and in a directional 3D autostereoscopic mode. When embodied as a liquid crystal device whose pixel apertures are at least partially defined by a black mask, there are no undesirable visual artefacts associated with the black mask in the 2D mode.

The pitch alignment of the polarisation modifying layer determines the parallax barrier pitch, which typically has to be set to within 0.1 micrometers. The barrier may be made of a glass substrate with similar thermal expansivity to the spatial light modulator so as to minimise misalignments during heating of the system between switch on and operating temperatures. The high tolerance alignment can be fixed during manufacture and is unaffected by switching between 2D and 3D modes. There are six critical degrees of freedom alignment tolerances in such displays with respect to the positioning of the apertures of the barrier relative to the spatial light modulator and these do not have to be set in the field. Because the removable or switchable element can be a uniform polarisation element, accurate alignment is only necessary in one degree of freedom i.e. rotation about an axis normal to the display surface. Rotation about the other two axes and spatial positioning may all be set with low and easy to satisfy tolerance requirements. Thus mechanical assembly is substantially simplified and cost, size and weight can be reduced.

It is possible to switch different regions of the display independently to allow 3D and 2D regions to be mixed simultaneously on the display surface.

A colour 3D display can be provided with low cross talk using relatively simple and inexpensive birefringent elements. The 2D mode may be substantially as bright as a conventional display with the same angle of view. Thus, the same backlight as for a conventional display may be used and battery life and brightness will not be compromised. An anti-reflection coating may be applied to the outside surface to reduce reflections and improve display contrast. There are minimal absorption or reflection losses from such an additional layer.

When applied to an observer tracking display, the tracking may be performed by relative movement between the spatial light modulator and the polarisation modifying layer. Thus, the polarisation modifying layer may remain attached to the mechanical system at all times. The polariser does not need to be attached to the mechanical system at all so that mounting is simplified. In fact, the polariser does not need to be mounted in physical proximity to the polarisation modifying layer and may indeed be provided in the form of glasses to be worn by an observer.

According to a first aspect of the invention, there is provided a passive polarisation modulating optical element comprising a layer of birefringent material having substantially fixed birefringence and comprising at least one first retarder having an optic axis aligned in a first direction and at least one second retarder having an optic axis aligned in a second direction different from the first direction.

The at least one first retarder may comprise a plurality of first retarders, the at least one second retarder may comprise a plurality of second retarders, and the first and second retarders may be arranged as a regular array. The first and second retarders may comprise first and second strips which alternate with each other. The first strips may have a first width and the second strips may have a second width less than the first width.

The first and second retarders may have a retardance of $(m+1)\lambda/2$, where m is an integer and $\lambda$ is a wavelength of visible light.

The second direction may be at substantially 45° to the first direction.

The birefringent layer may be disposed of an alignment layer comprising first and second regions corresponding to the first and second retarders, respectively, and having first and second alignment directions, respectively.

The birefringent material may comprise a reactive mesogen.

According to a second aspect of the invention, there is provided an optical device comprising an element according to the first aspect of the invention and a linear polariser for passing light polarised at a predetermined angle with respect to the first optic axis.

The predetermined angle may be substantially equal to 0°.

The polariser may comprise part of a further device. The further device may be a liquid crystal device.

According to a third aspect of the invention, there is provided a method of making a passive polarisation modulating optical element, comprising forming an alignment layer, providing at least one first region of the alignment layer with a first alignment direction, providing at least one second region of the alignment layer with a second alignment direction different from the first alignment direction, disposing on the alignment layer a layer of birefringent material whose optic axis is aligned by the alignment layer, and giving the optic axis of the birefringent layer.

The at least one first region may comprise a plurality of first regions, the at least one second region may comprise a plurality of second regions, and the first and second regions may be arranged as a regular array. The first and second retarders may comprise first and second strips which alternate with each other. The first strips may have a first width and the second strips may have a second width less than the first width.

The birefringent layer may have a thickness for providing a retardance of $(m+1)\lambda/2$, where m is an integer and $\lambda$ is a wavelength of visible light.

The second direction may be substantially at 45° to the first direction.

The birefringent material may comprise a reactive mesogen.

The fixing may be performed by irradiation. The fixing may be performed by ultraviolet irradiation.

The alignment layer may comprise polyimide.

The whole of the alignment layer may be provided with the first alignment direction, after which the or each second region may be altered to have the second alignment direction. The alignment layer may be rubbed in a first rubbing direction, the alignment layer may be masked to reveal the or each second region, and the or each second region may be rubbed in a second rubbing direction.

The alignment layer may comprise a linearly photopolymerisable polymer, the alignment layer may be masked to reveal the or each first region, the or each first region may be exposed to radiation having a first linear polarisation, the alignment layer may be masked to reveal the or each second region, and the or each second region may be exposed to radiation having a second linear polarisation different from the first linear polarisation.

Such an optical element may be used, for instance, to provide a parallax barrier which may be used in an autostereoscopic display and whose parallax barrier operation may be disabled to permit such a display to be used in a two dimensional (2D) mode. A device of this type is disclosed in British patent application No: 9713985.1. When in the 2D mode, it is advantageous to avoid any difference in light absorption between the regions which act as the slits in the 3D mode and the regions between the slits. Otherwise, in the 2D mode, visible. Moire patterning could be produced by beating of the variation in absorption with the pixel structure or the display.

The optical element may be made using a single photolithographic mask step, thus reducing the complexity of manufacture and the cost of the element. The element may be bonded to another substrate so as to avoid damage to its surface without affecting the optical properties of the element. The element may be formed on a glass substrate which allows the application of a low-cost anti-reflection layer on the opposite surface substrate prior to making the element.

The optical element may be manufactured using existing processes, such as spin coating, photolithographic masking and rubbing techniques. Thus, optical elements of this type may be manufactured in high volume at low cost. The element is manufactured without the removal of retarder material and so can be more easily made without introducing surface artefacts or damage and without requiring subsequent planarisation. Bu using photolithographic techniques, the retarder regions may be formed with high accuracy and resolution so that such an element is suitable for use in a viewpoint corrected parallax barrier. Further, it is possible to provide an element having high levels of dimensional stability.

BRIEF DESCRIPTION OF THE DRAWINGS

The invention will be further described, by way of example, with reference to the accompanying drawings, in which:

FIG. 15 comprising

FIG. 16 comprising

FIG. 17 comprising

FIG. 18 comprising

FIG. 19 comprising FIGS. 19(a) to 19(e) illustrates a first method of making a polarisation modifying layer;

FIG. 20 comprising FIGS. 20(a) to 20(i) illustrates a sixth method of making a polarisation modifying layer;

FIG. 35 illustrates alignment layer orientation and mask appearance for a parallax barrier constituting an embodiment of the invention and providing reduced diffraction by spatial modulation of slit edges;

FIG. 36 comprises 36a to 36e and illustrates a method of making an optical element constituting an embodiment of the invention.

DETAILED DESCRIPTION OF THE PREFERRED EMBODIMENTS

Figure 1:
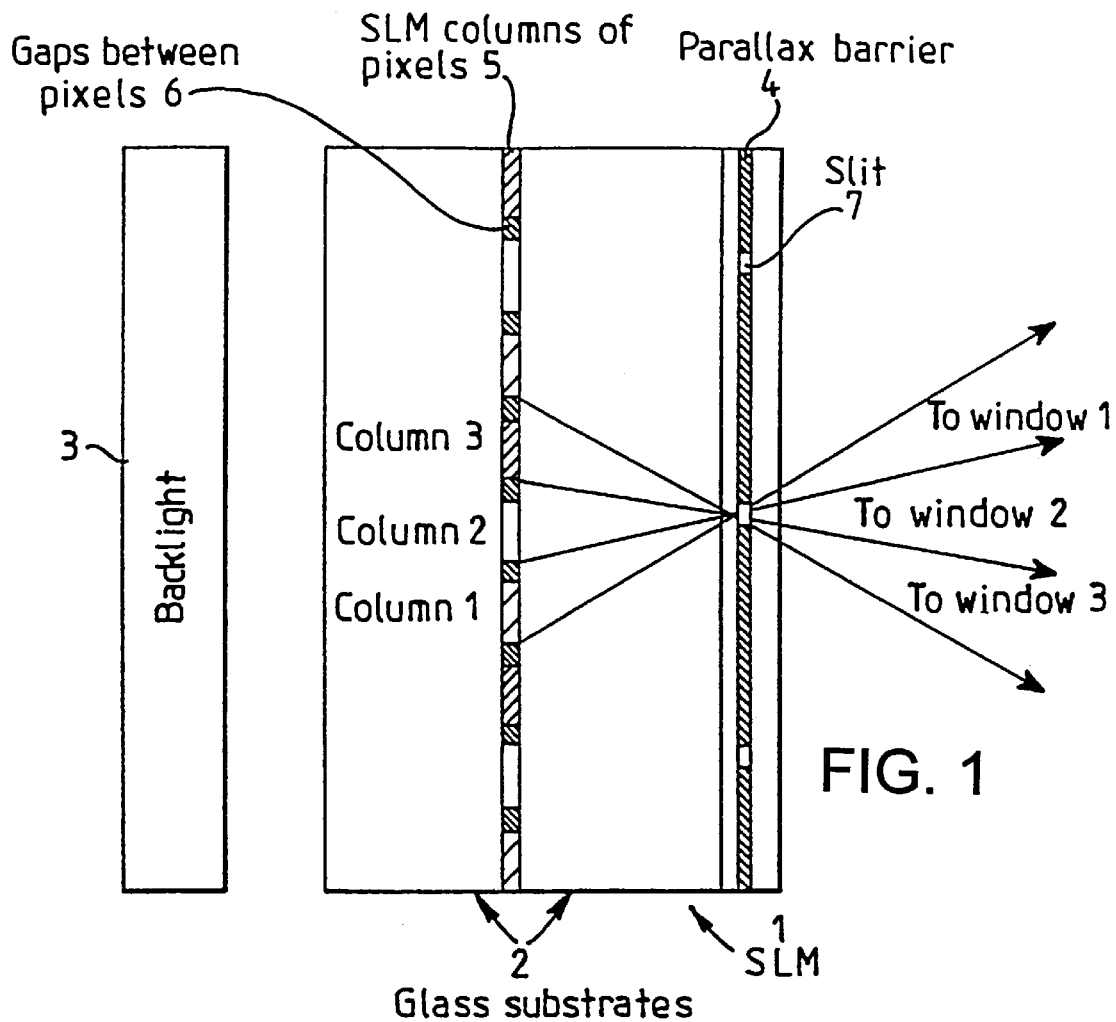
FIG. 1 is a diagrammatic horizontal sectional view of a known type of autostereoscopic 3D display.
Figure 2:
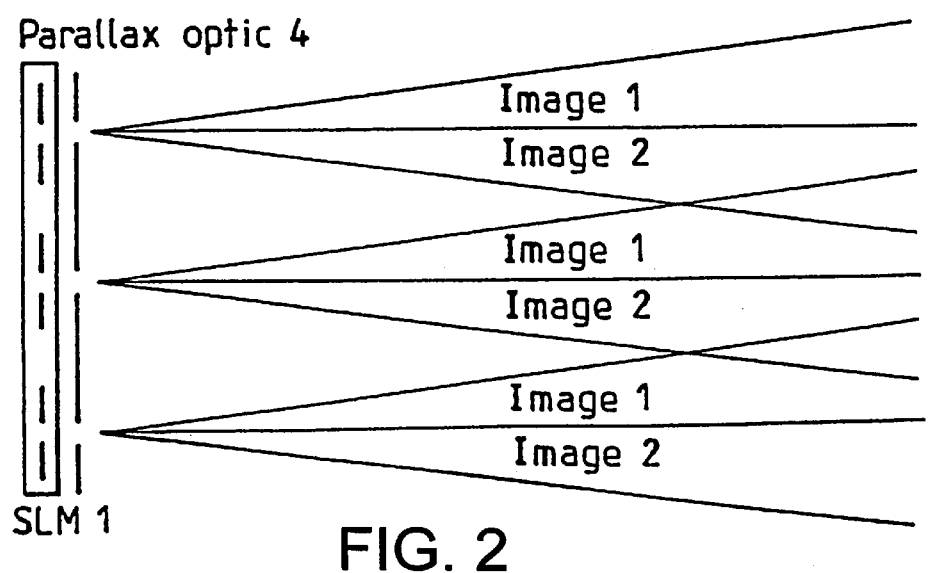
FIG. 2 is a plan view illustrating light cones produced by a non-view point corrected display.
Figure 3:
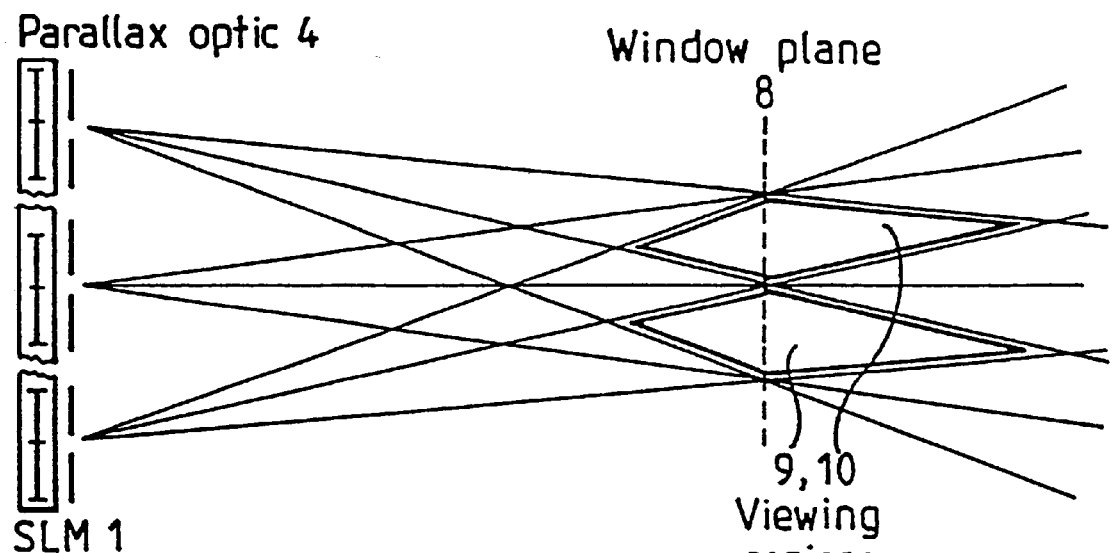
FIG. 3 is a view similar to FIG. 2 illustrating the creation of viewing regions in a view point corrected display.

Like reference numerals refer to like parts throughout the drawings.

Figure 5:
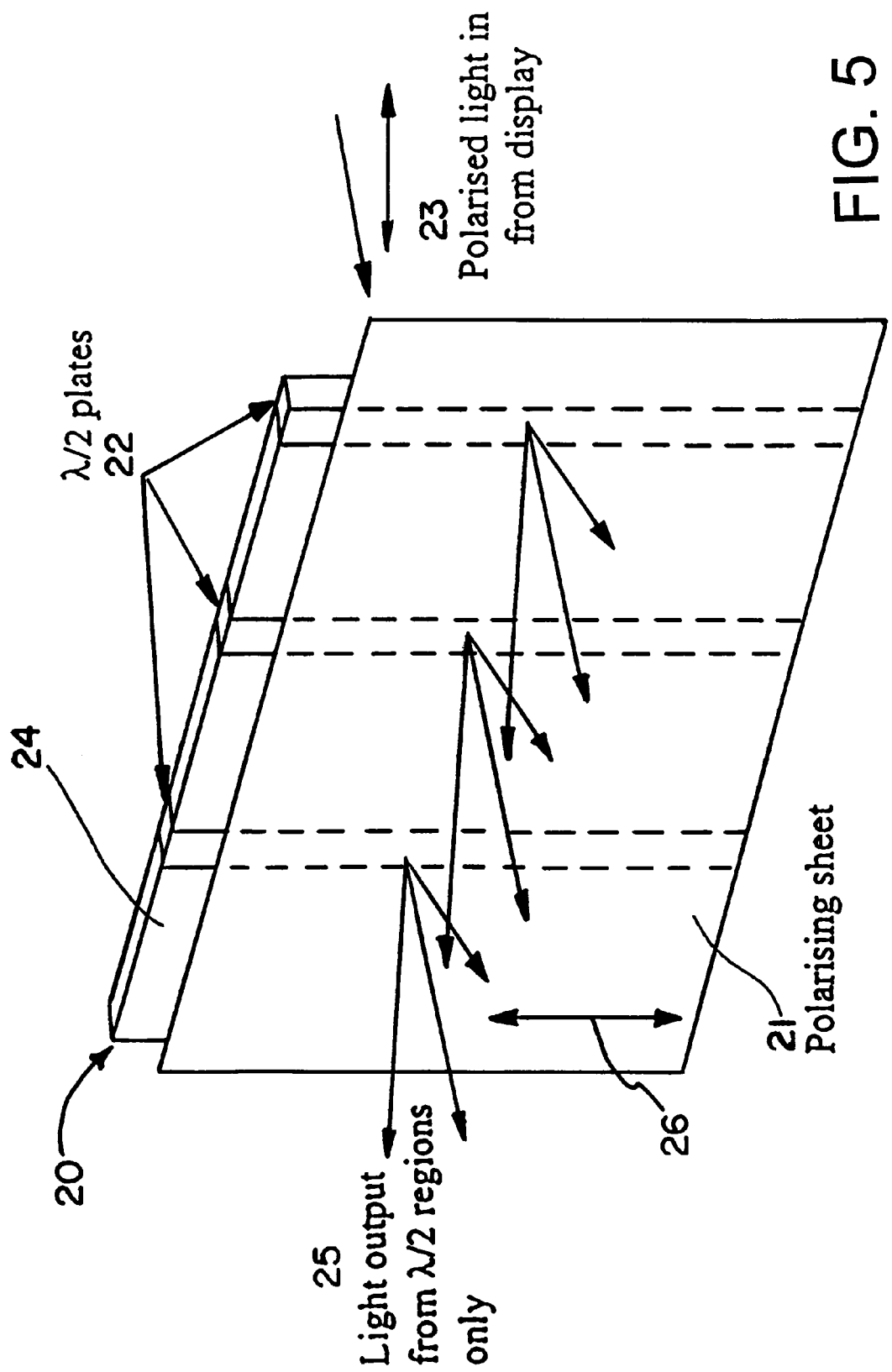
FIG. 5 is a diagrammatic view of a parallax barrier constituting an embodiment of the invention.

The parallax barrier shown in FIG. 5 comprises a polarisation modifying layer 20 and a polariser in the form of a polarising sheet 21. The polarisation modifying layer 20 comprises aperture regions 22 in the form of parallel elongate slit regions arranged to rotate linear polarisation 23 of incoming light through 90 degrees. The aperture regions 22 are separated by barrier regions such as 24 which are arranged not to affect the polarisation of the incoming light. The regions 22 may for instance comprise appropriately aligned half waveplate polarisation retarders or 90 degree polarisation rotators. The aperture regions 22 are disposed at the desired pitch of the parallax barrier, incorporating any viewpoint correction as described hereinbefore, and are of the width required for the parallax barrier slits. Typical values for the pitch and width of such slits are 200 micrometers and 50 micrometers, respectively. The aperture regions 22 have an optic axis aligned so as to rotate the input polarisation through 90 degrees. For instance, when the parallax barrier is disposed in front of a liquid crystal display (LCD) of the thin film transistor (TFT) type, light from the LCD is polarised at +45 degrees to a vertical axis of the LCD with which the strip-shaped aperture regions 22 are parallel. The optic axis is therefore arranged so that the polarisation of light 25 output from the slit regions is at −45 degrees with respect to the same vertical axis. The barrier regions 24 are transparent regions with little or no effect on the transmitted light, which therefore remains polarised at +45 degrees.

The polarising sheet 21 has a polarising direction indicated at 26 which is substantially orthogonal to the polarisation direction 23 of incoming light and hence of light passing through the regions 24. However, the polarisation direction 26 is parallel to the polarisation direction of light passing through the slit regions 22 so that the parallax barrier operates in a barrier mode with incoming light being transmitted through the slit regions 22 and being substantially blocked or extinguished through the parts of the barrier defined by the barrier regions 24.

In order to operate the parallax barrier in a non-barrier mode, the polarising sheet 21 is disabled, for instance by being removed. In this mode, the strip regions 22 are substantially invisible because they are not analysed by any polarising sheet. By arranging for the regions 22 and 24 to have substantially the same transmissivity, there should be no undesirable visual artefacts, such as Moire beating with the pixel structure of an associated LCD. Although the slit regions 22 still rotate the polarisation direction of the incident light, this is not visible to the human eye when the polarising sheet 21 has been removed. In this mode, the parallax barrier allows the full spatial resolution of the associated LCD to be available for 2D display with very little attenuation of light. The parallax barrier of FIG. 5 may be used to replace the front parallax barrier 4 shows in FIG. 1 so as to provide an autostereoscopic 3D display constituting an embodiment of the invention.

Figure 6A:
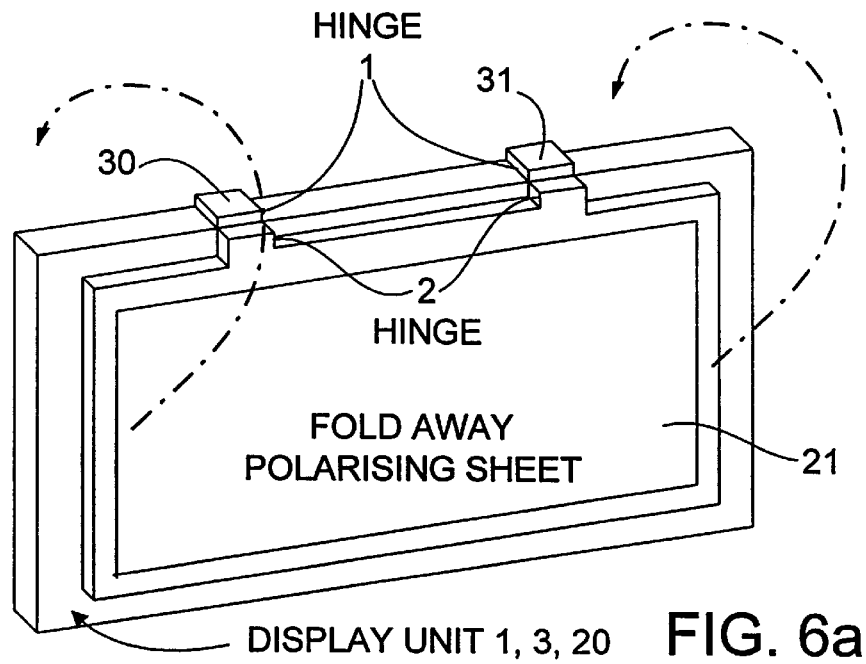
FIGS. 6a, 6b and 6c are a diagrammatic view illustrating an arrangement for switching between modes of the barrier of FIG. 5.

A convenient way of arranging for the polariser sheet 21 to be removable is illustrated in FIG. 6a. The polariser sheet 21 is attached to the remainder of the autostereoscopic display by double hinges 30 and 31. The allows the polariser sheet 21 to be swung over the front of the display with the polariser alignment controlled by the base line of the hinges and optionally further constrained by a location datum on the opposite edge of the polariser sheet from the hinges. In the 2D mode, the polariser is folded over the rear of the display unit and stored flush against the rear of the display unit.

Figure 6B:
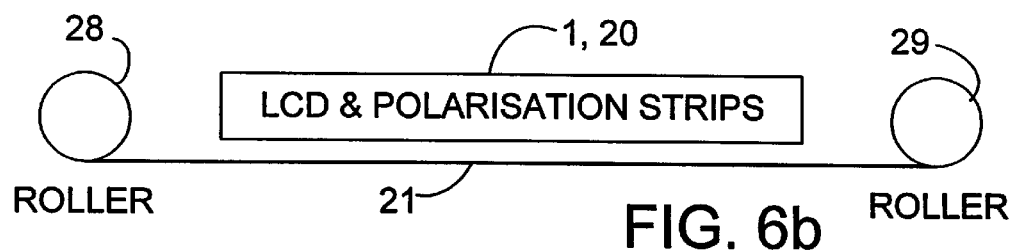

Another convenient way of arranging for the polariser sheet 21 to be removable is illustrated in FIG. 6(b). The polarising sheet 21 is formed on a transparent film having a longitudinal region which is transparent and non-polarising. The film is wound on rollers 28 and 29 disposed at either side of the LCD 1 and polarisation modifying layer 20. The rollers 28 and 29 are driven, for instance by an electric motor, so that the polarising region 21 or the transparent non-polarising region of the film may be disposed in front of the LCD 1 and layer 20. Alternatively, the rollers 28 and 29 may be operated manually. When the polarising region 21 is in front of the LCD 1 and layer 20, the display operates in the 3D mode whereas, when the transparent non-polarising region of the film is in front of the LCD 1 and layer 20, the display operates in the 2D mode.

Figure 6C:
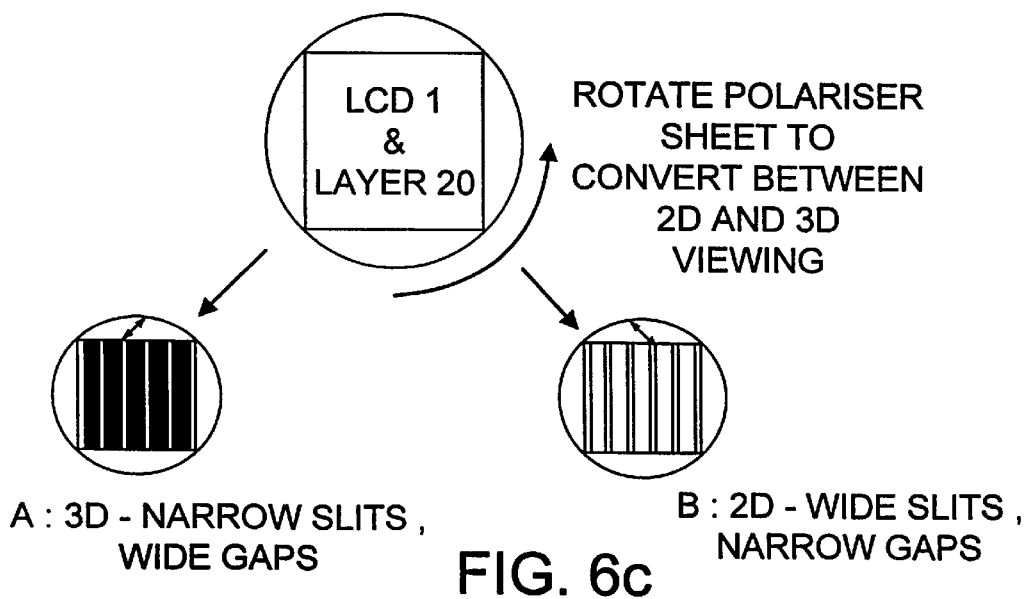

FIG. 6(c) illustrates a further way of switching between 3D and 2D modes of operation. In this case, the polarising sheet 21 is permanently disposed in front of the LCD 1 and the layer 20 but is rotatable about an axis perpendicular to the sheet 21. When the rotary position of the polarising sheet 21 is such that it transmits light from the slit regions 22 but extinguishes light from the barrier regions 24, the display operates in the 3D mode with a front parallax barrier as illustrated at A. Thus, a barrier is formed with narrow transmissive slits and wide opaque gaps. However, when the polarising sheet 21 is rotated through 90° it blocks or extinguishes light from the slit regions 22 but transmits light from the barrier regions 24. In this case, as illustrated at B, light is transmitted through wide "slits" whereas narrow opaque "gaps" are formed. Although the arrangement illustrated at B may be thought of as continuing to act as a parallax barrier, the viewing regions are not as well-defined and a broad 2D region is produced. The residual opaque regions will reduce the brightness in the 2D mode compared with displays in which there are no opaque regions formed by the parallax barrier. This is a convenient technique but there may be some residual Moire effects in from black areas on the mask.

Figure 4:
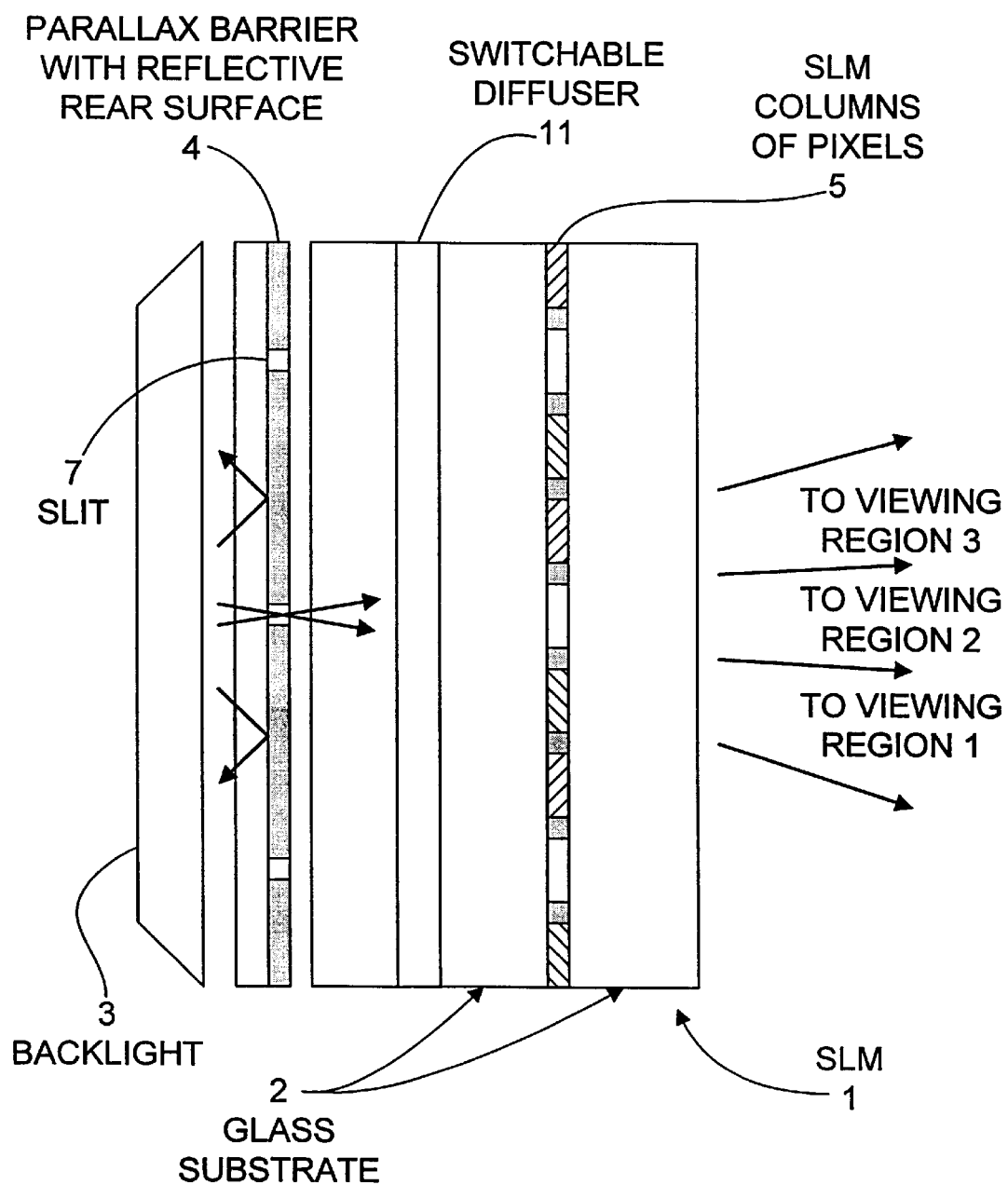
FIG. 4 is a diagrammatic horizontal sectional view of another known type of autostereoscopic 3D display.

If the parallax barrier 4 in the known types of display such as those shown in FIGS. 1 and 4 were made removable in order to provide a full resolution high brightness 2D mode of operation, it would have to be provided with mounts which defined the location in five degrees of freedom, namely two translation axes and three rotation axes, to positional tolerances of the order of 5 micrometers. It is also particularly difficult to maintain parallelism between the parallax barrier 4 and the SLM 1. Any bow in either element would cause deviations in the window generating Moire pattern. This results in reduced viewing freedom and increased levels of cross talk of the display. A removable element would have to compensate for such bows and this is very difficult to achieved in a robust manner with low cost overheads while preserving ease of use and reasonable bulk in the removable element.

The effective plane of the parallax barrier shown in FIG. 5 is at the plane of the polarisation modifying layer 20. The alignment of this layer 20 with the associated LCD determines the optical alignment of the autostereoscopic display. For the parallax barrier shown in FIG. 5, the layer 20 may be left permanently fixed to the associated LCD and so can conform to any bows in the LCD, minimising the degradation to window quality. This ensures rigidity and allows for adhesives or other forms of permanent fixative to be employed, for instance during manufacture or as a subsequent fitment using precision alignment tools which are available on LCD production lines. The removable polarising sheet 21 merely needs to be realigned in one rotational axis on replacement in front of the sheet 20. The tolerance on translational position is merely that the whole of the display surface be covered by the polariser sheet 21 and rotations around axes in the plane of the display surface do not affect the polarisation absorption axis. Accordingly, the only requirement is for rotational alignment about an axis normal to the display surface to ensure good extinction of light from the barrier regions 24. In order to reduce light leakage from the barrier regions 24 to below 1%, the alignment tolerance is of the order of plus or minus 5 degrees and this is easy to satisfy.

Figure 7:
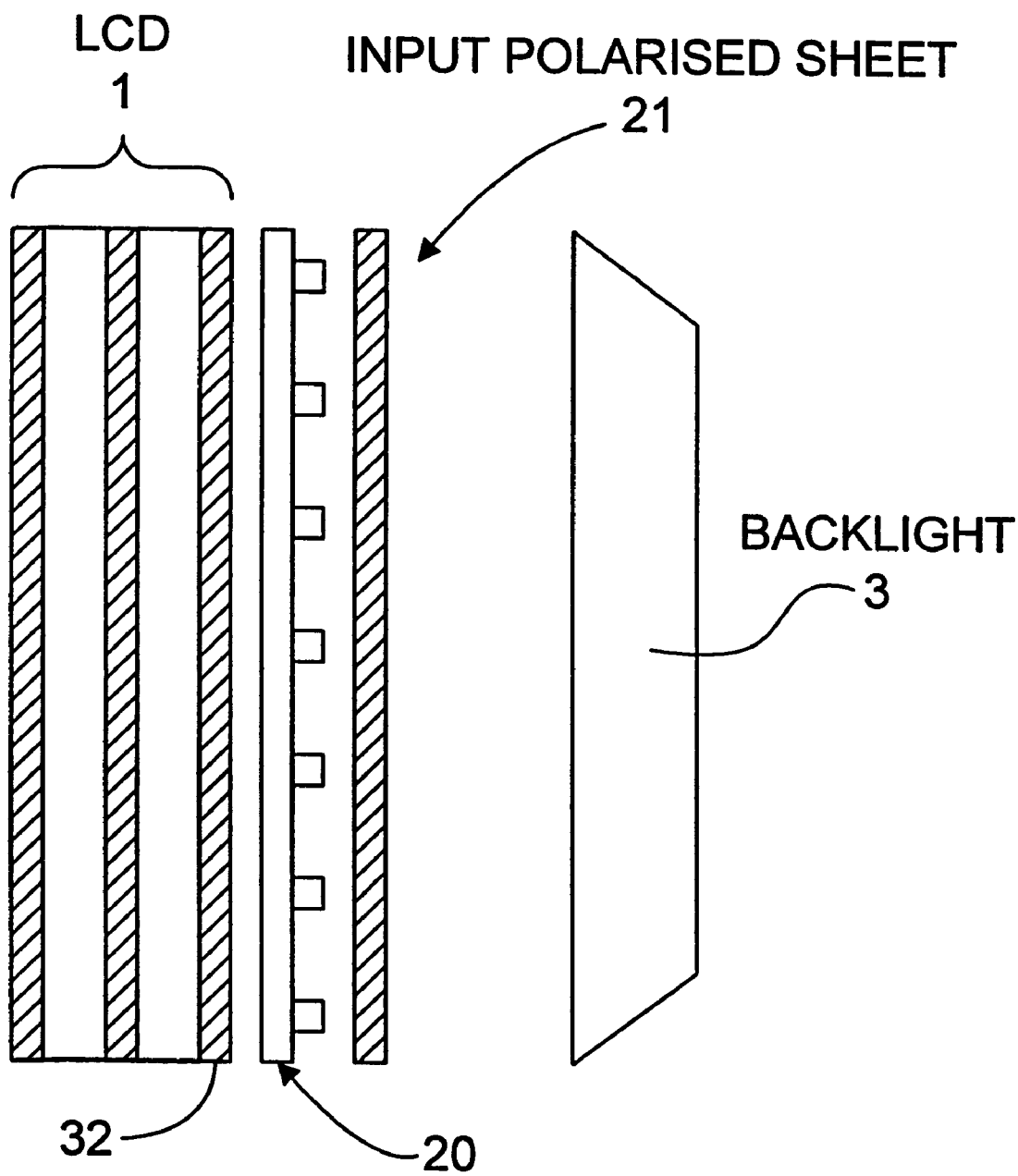
FIG. 7 is a diagrammatic plan view of an autostereoscopic 3D display constituting an embodiment of the invention.

FIG. 7 illustrates the use of the parallax barrier of FIG. 5 in a rear parallax barrier autostereoscopic display. The polarisation modifying layer 20 is disposed adjacent the LCD 1 and the polariser sheet 21 acts as an input polariser and is disposed between the layer 20 and the backlight 3. The LCD 1 has an input polariser 32 whose polarisation direction is aligned so as to pass light from the strip regions 22 and to block light from the barrier regions 24. Thus, the polarisation directions of the input polariser sheet 21 and the LCD polariser 32 are orthogonal. In order to provide a full resolution high brightness 2D mode, the polariser sheet 21 is removed from the light path.

The strip regions 22 are shown in the drawings as being fabricated on a substrate and, in particular, on the outer surface of the substrate, i.e.: the surface of the substrate facing away from the LCD 1. This is merely an example as the strip regions 22 may be fabricated on either surface of the substrate. If the strip regions are fabricated on the inner substrate surface, i.e.: that facing the LCD 1, they may be in contact with the LCD 1 and will be protected from scratching and dirt by the substrate. Furthermore, the optimum viewing distance of the display in the 3D mode is set by the separation of the liquid crystal layer in the LCD 1 and the strip regions 22. With the strip regions 22 on the inner surface of the substrate, the separation is reduced and hence the optimum viewing distance is reduced.

Figure 8:
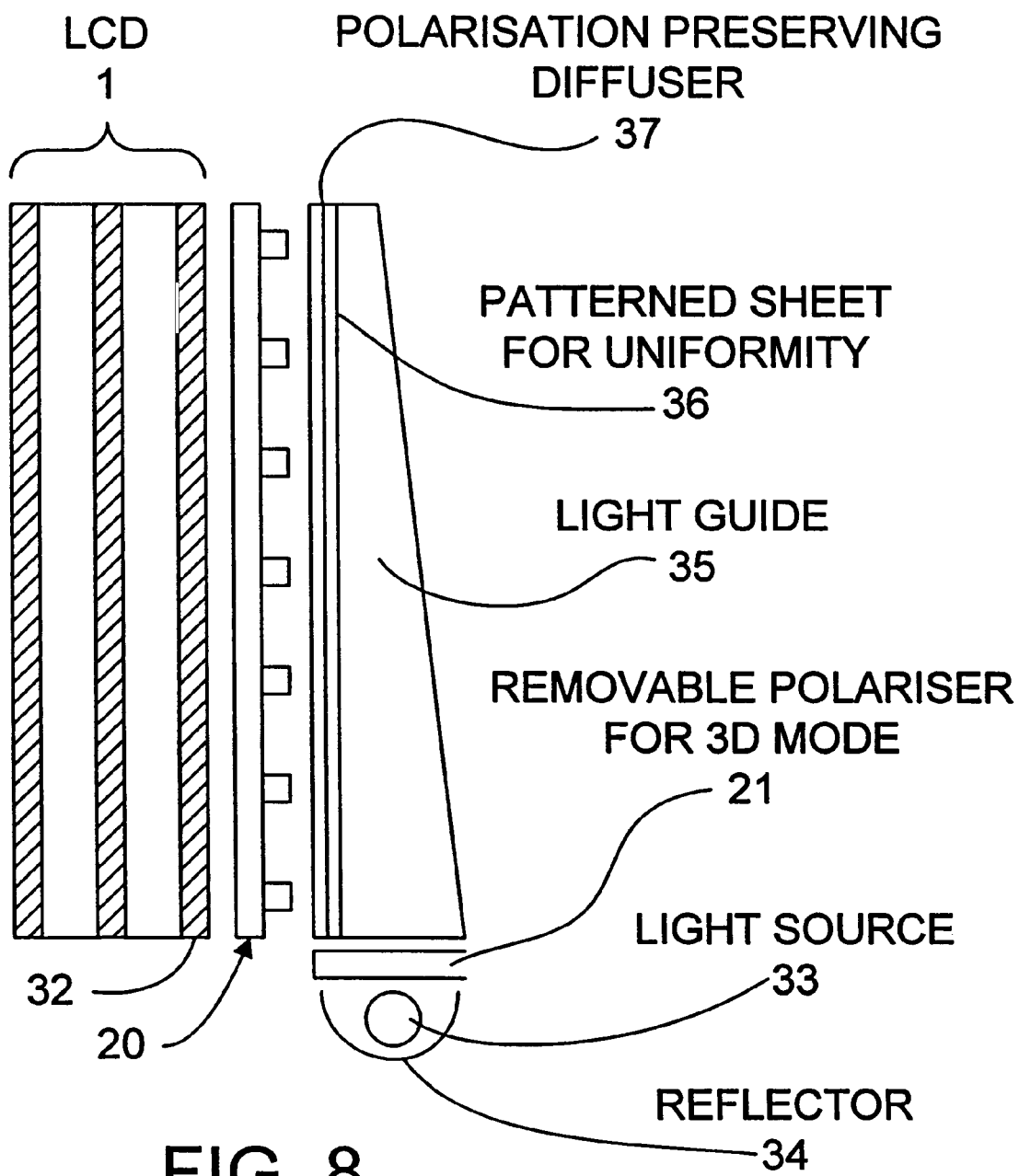
FIG. 8 is a diagrammatic plan view of an autostereoscopic 3D display constituting another embodiment of the invention.

FIG. 8 illustrates a rear parallax barrier display in which the removable polariser 21 forms part of the backlight. The backlight comprises a light source 33 and a reflector 34 which, in the 3D mode, direct light through the polariser sheet 21 into a light guide 35. The light guide 35 has on its output surface a patterned sheet 36 for providing uniformity of illumination of the LCD 1 and a polarisation preserving diffuser 37 to scatter the output light into a wider range of angles. Such diffusers may be lenticular in nature.

This arrangement allows the use of a relatively small polariser 21 at the input surface of the light guide 35. The polariser 21 can be moved out of the light path by a relatively short movement in order to achieve the full resolution high brightness 2D mode of operation.

Figure 9:
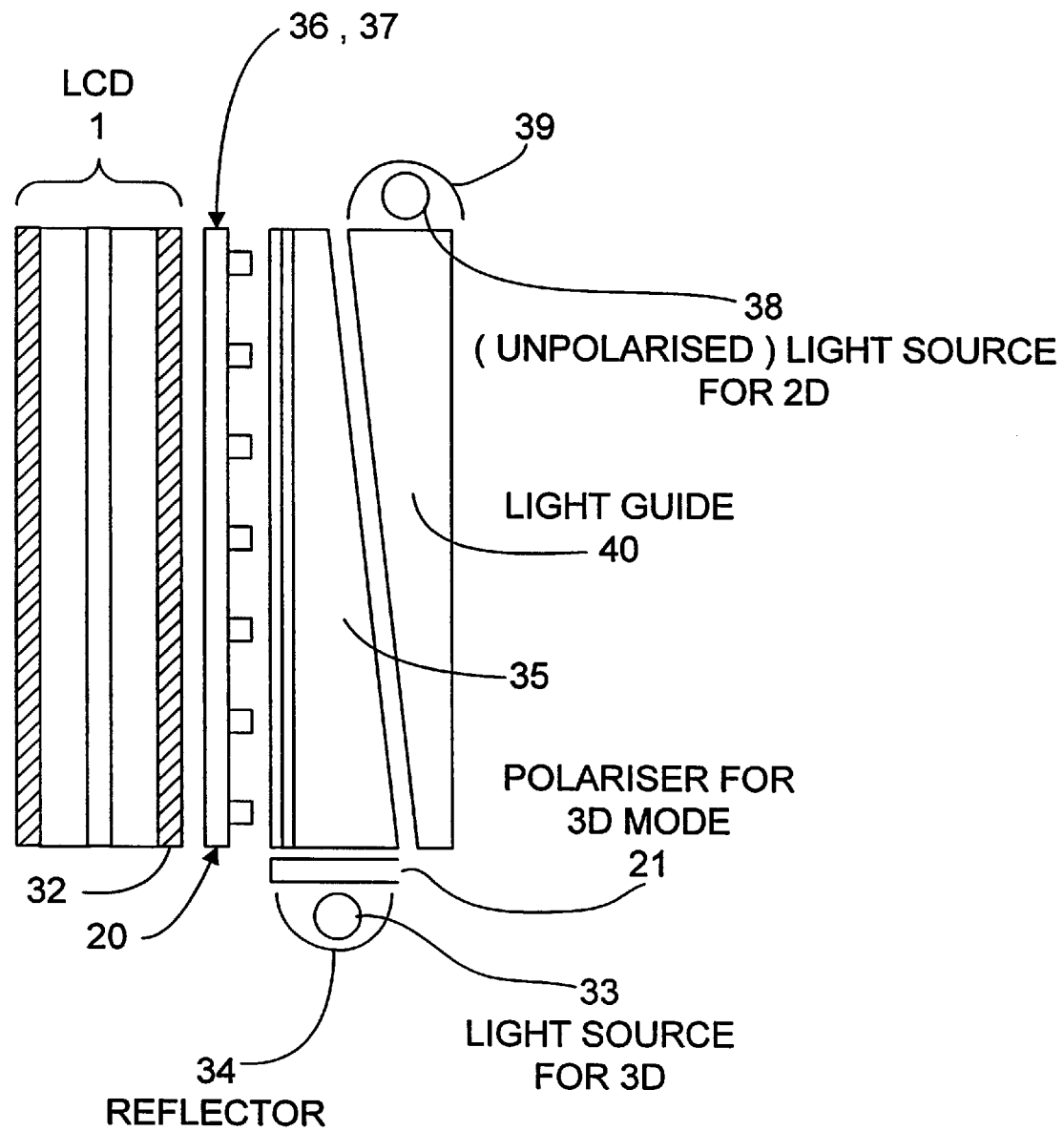
FIG. 9 is a diagrammatic plan view of an autostereoscopic 3D display constituting another embodiment of the invention.

FIG. 9 illustrates an autostereoscopic display having a polarised light source of the type illustrated in FIG. 8 but in which the polariser 21 is fixed at the input of the light guide 35. The light source 33 is illuminated for 3D operation.

The display comprises a further unpolarised backlight in the form of a light source 38, a reflector 39 and a light guide 40. The light guides 35 and 40 are disposed such that output light from the light guide 40 passes through the light guide 35. In the full resolution high brightness 2D mode, the light source 33 is extinguished and the light source 39 is illuminated so that unpolarised light passes through the light guide 35 and illuminates the LCD 1 through the layer 20.

Figure 10:
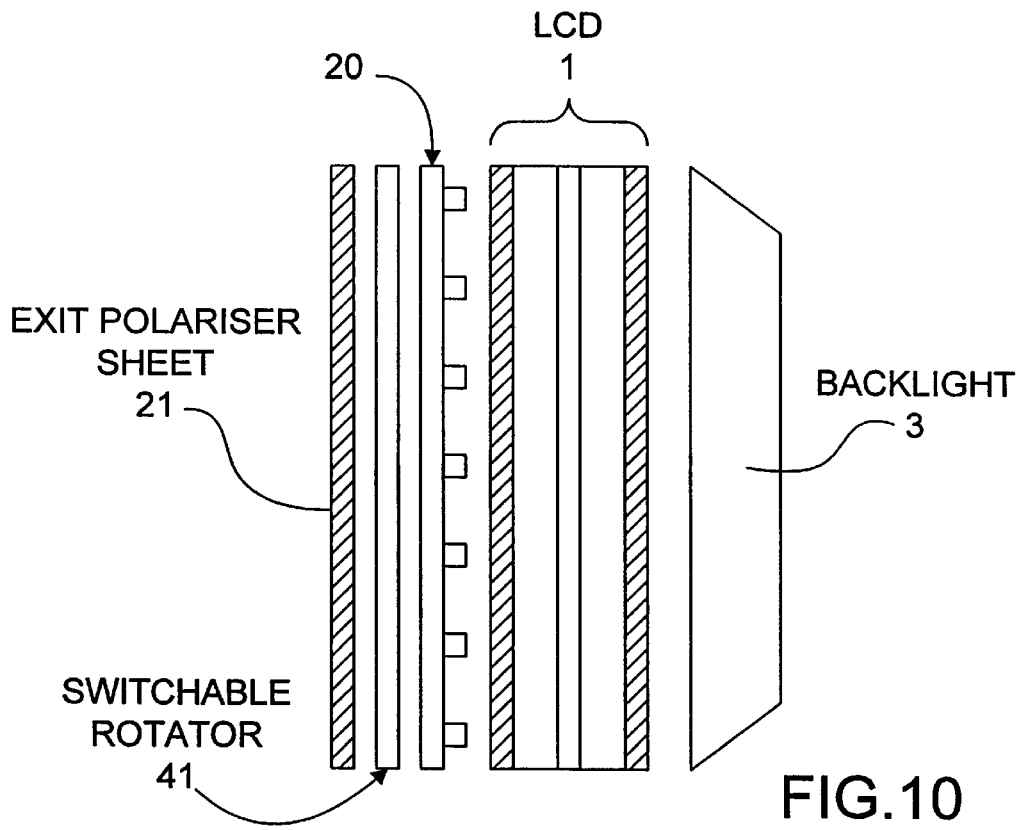
FIG. 10 is a diagrammatic plan view of an autostereoscopic 3D display constituting another embodiment of the invention.

FIG. 10 shows an example of a front parallax barrier autostereoscopic display which is switchable between 3D and 2D modes without requiring any mechanical movement. The polarisation modifying layer 20 is disposed adjacent the output surface of the LCD 1 and the exit polariser sheet 21 is located at the output of the display. A switchable quarter wave rotator 41 is disposed between the sheet polariser 21 and the layer 20. The rotator 41 is switchable between a first state in which it does not affect the transmitted polarisation and a second state which causes the polarisation states to be equally transmitted through the sheet polariser 21. In the second state, the rotator 41 acts as a quarter waveplate with the optic axis at 45 degrees to the polarising axis of the sheet polariser 21. Thus, the linear polarisations from the regions 22 and 24 are both converted to circular polarisations of opposite handedness of which 50% is transmitted by the sheet polariser 21.

An advantage of this type of arrangement is that the control element 41 may be spatially controlled so that the two modes co-exist in different regions. This allows some parts of the display to operate in the 2D mode and other parts in the 3D mode.

Figure 11A:
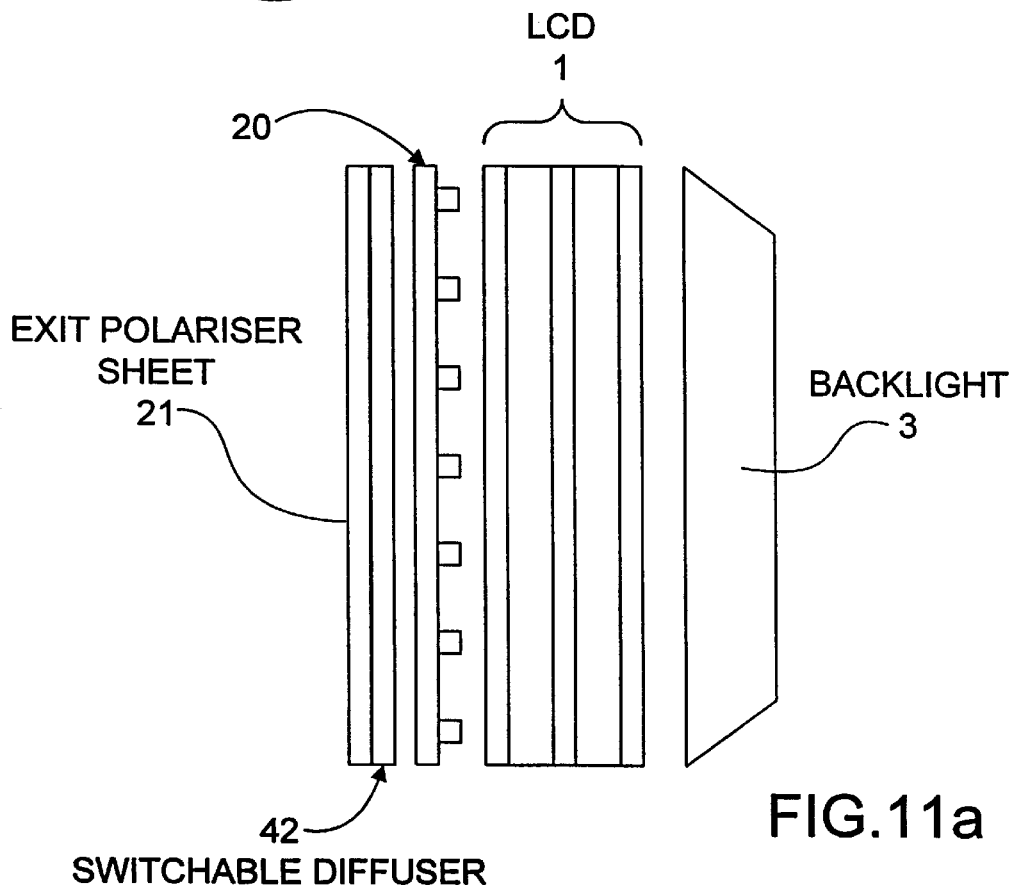
FIG. 11a is a diagrammatic plan view of an autostereoscopic 3D display constituting another embodiment of the invention.

The display shown in FIG. 11*a* differs from that shown in FIG. 10 in that the switchable quarter wave rotator 41 is replaced by a switchable diffuser 42. The diffuser 42 is switchable electronically between depolarising and non-depolarising states. Such a diffuser may be embodied as a polymer dispersed liquid crystal device.

In its low diffusing state, the switchable diffuser 42 has substantially no effect on operation so that the display operates in the autostereoscopic 3D mode. In the more highly diffusing state, the diffuser 42 has two effects. Firstly, the diffuser destroys the polarisation of incident light so that light from the regions 22 and 24 are transmitted substantially equally through the exit polariser sheet 21. Secondly, the diffuser destroys the directionality of light through the system by scattering the transmitted light into random directions. However, the scattering effect of the diffuser 42 does not need to be strong because the loss of polarisation is sufficient to cause the display to operate in the 2D mode. The diffuser 42 is merely required to provide sufficient scattering for an adequate angle of view of the display. Thus, the diffuser 42 is required to provide less dense scattering of light than for known types of system so that a brighter 2D mode may be achieved.

Figure 11B:
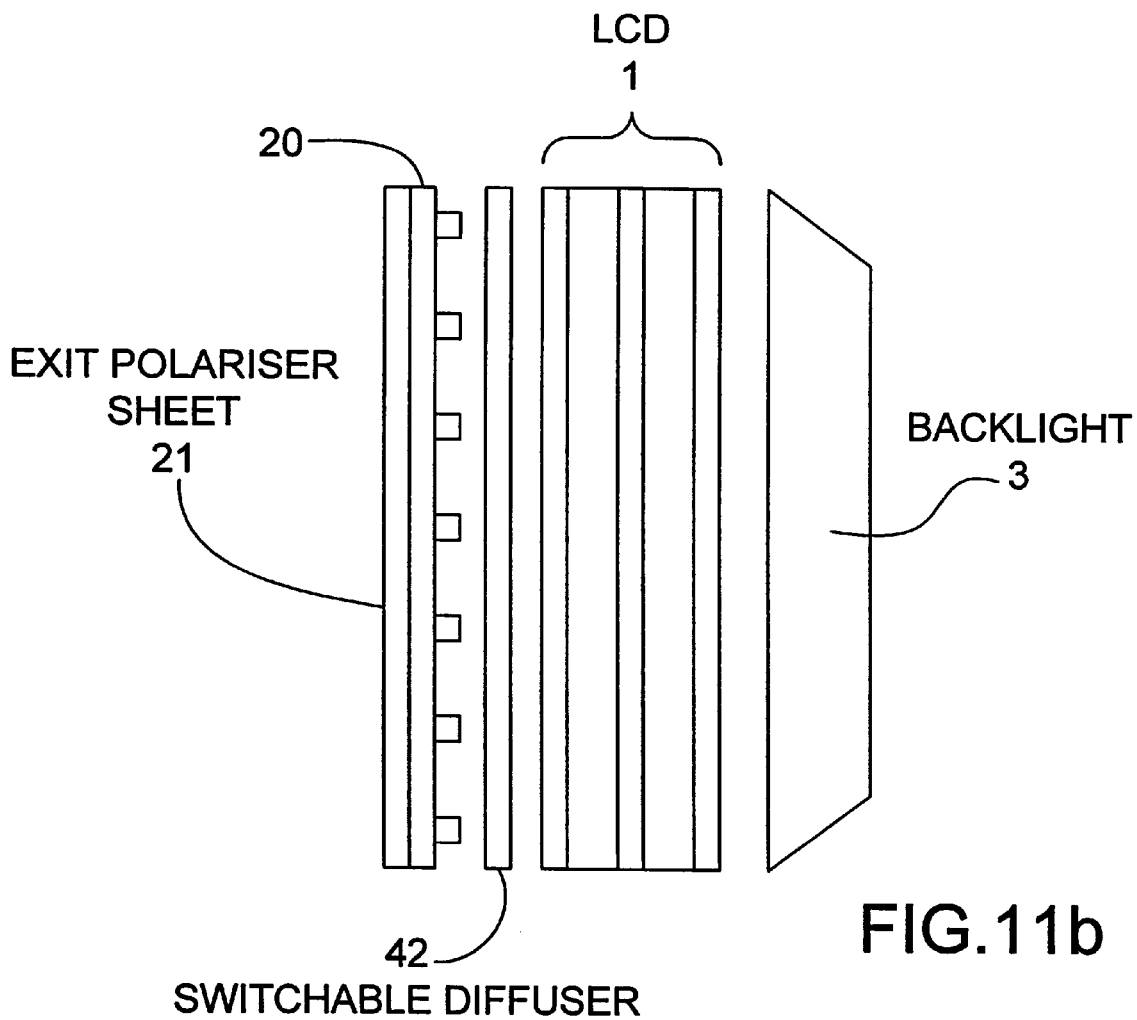
FIG. 11b is a diagrammatic plan view of an autostereoscopic 3D display constituting another embodiment of the invention.

The display shown in FIG. 11*b* differs from that shown in FIG. 11*a* in that the positions of the layer 20 and the switchable diffuser 42 are interchanged.

A switchable diffuser 42 may also be used in rear parallax barrier arrangements. The diffuser 42 may also be controllable so that different regions can be controlled to operate in different modes so as to provide a display in which some regions operate in the 2D mode and others simultaneously operate in the 3D mode. This arrangement may be more appropriate because the diffuser will not substantially affect image visibility in the 2D state.

The parallax barriers disclosed herein may be used in the display disclosed in British Patent Application No 9702259.4. This display is of the autostereoscopic type and includes an indicator visible to an observer so that the observer can position himself at the optimum viewing location. In some circumstances, it may be advantageous to be able to disable the visual position indication and this may be achieved by disabling the part of the parallax barrier which provides the indication, for instance as described hereinbefore for mixed 3D and 2D operation.

Figure 12:
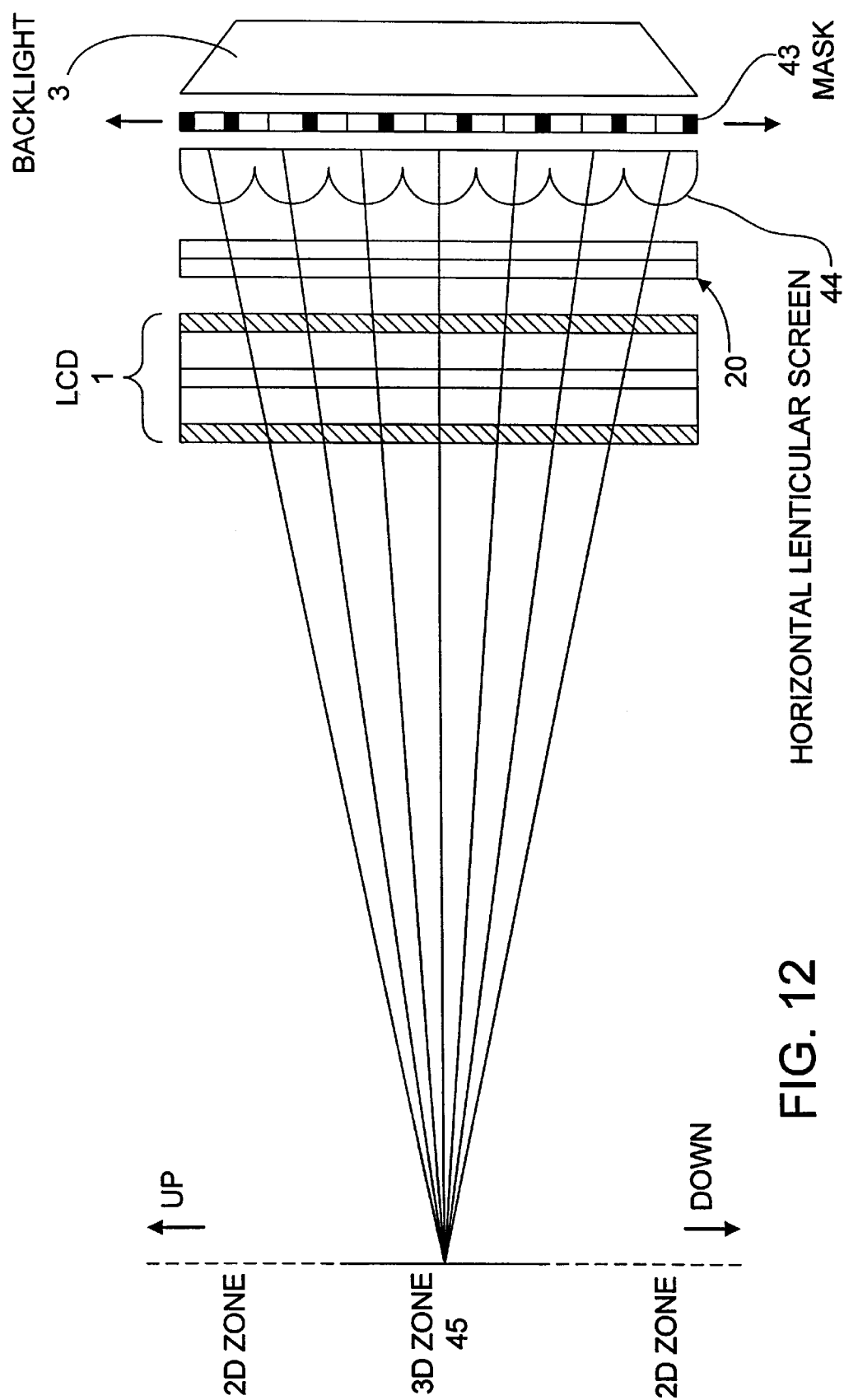
FIG. 12 is a diagrammatic plan view of an autostereoscopic 3D display constituting another embodiment of the invention.

FIG. 12 illustrates a display of the rear parallax barrier type similar to that shown in FIG. 7 but in which the polariser sheet 21 is replaced by a mask 43 and a parallax optic 44 which is illustrated as a lenticular screen but which may alternatively comprise a parallax barrier. The parallax optic 44 is optional because the parallax between the mask elements of the mask 43 and a pixel black mask within the LCD 1 serve to generate viewing zones 45 but with larger overlaps at the boundaries between the zones. The mask 43 comprises horizontal strips arranged, for example, as groups of three strips with each group comprising a polarising strip, a clear strip and an opaque strip. Each group of strips is associated with a parallax element, in the form of a lenticule, of the lenticular screen 44.

The mask 43 is vertically movable with respect to the lenticular screen 44. In the position illustrated in FIG. 12, the polarising strips are aligned with the lenticules of the screen 44 so as to provide 3D operation with an observer located in a zone indicated at 45. An observer in the zone 45, which is the normal viewing zone of the display, can thus perceive a 3D image.

When 2D operation is required, the mask 43 is moved relative to the screen 44 so that the clear strips are imaged into the zone 45. This allows the display to operate in the full resolution high brightness 2D mode. Switching between 3D and 2D modes can therefore be achieved by a relatively small movement. The dark or opaque strips are used to avoid leakage of polarised light into the unpolarised viewing region and vice versa.

The mask 43 may be made by any suitable method, such as that disclosed in JP 63-158525A.

Although the optical functions of the regions 22 and 24 of the parallax barrier could be reversed so that the barrier regions 24 rotate the polarisation and the strip regions 22 have substantially no effect on polarisation, the arrangement described hereinbefore with reference to FIG. 5 is generally preferred. In particular, the dark level of the opaque regions formed by the barrier regions 24 and the associated regions of the polariser sheet 21 are effectively provided by two crossed polarisers without any intermediate (optically active) element. This provides strong extinction of light over a broad range of wavelengths and so minimises cross talk in the display.

A possible alternative arrangement of the parallax barrier in the displays is for the two polarisers to have parallel polarisation directions, the barrier regions 24 to be optically active in order to provide the polarisation rotation, and the slit regions 22 not to affect polarisation. As described hereinbefore, in such an arrangement, the critical opaque regions of the barrier rely on the performance of the polarisation rotating material to achieve high extinction and light leakage of less than 1%. A possible means for achieving this makes use of a polymerised layer of twisted nematic liquid crystal having a thickness which satisfies the first minimum criterion as the regions 24. An advantage of such an arrangement is that the slit regions 22 are neutral and therefore have optimum chromatic performance to provide a 3D mode with reduced colour imbalance.

Figure 13:
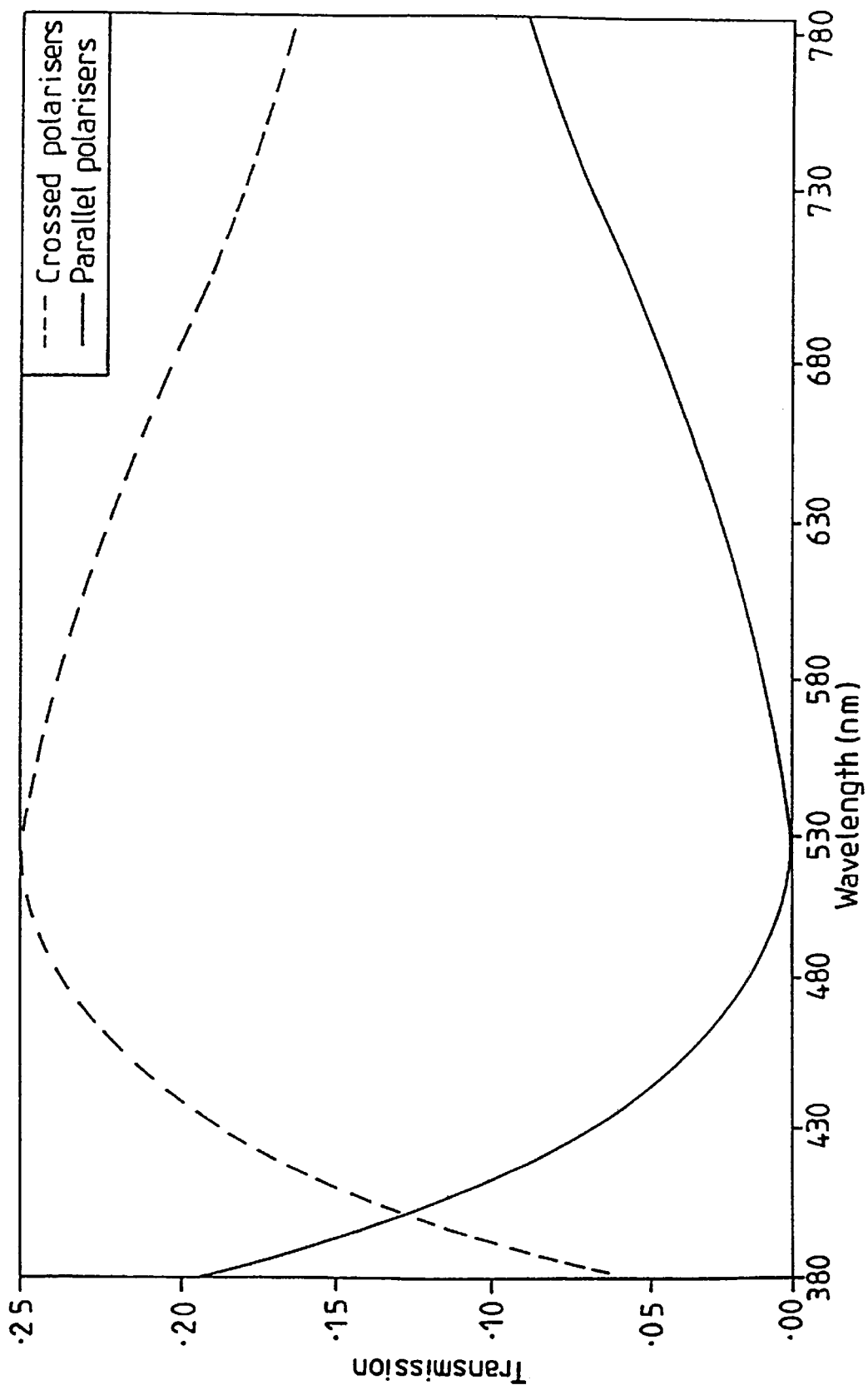
FIG. 13 is a graph of fractional transmission against wavelength in nanometers illustrating transmission of unpolarised light through two polarisers with a half waveplate disposed therebetween.

The polarisation rotation performed by the strip regions 22 does not generally work optimally over such a broad range of wavelengths. Thus, some parts of the visible spectrum are transmitted less than others. FIG. 13 illustrates the calculated transmission of unpolarised light through an output polariser of the LCD 1, a waveplate made of a uniaxial birefringent material known as RM257 available from Merck (UK), and the polariser sheet 21. When the two polarisers have their polarising axes crossed, transmission is highest by design at the centre of the visible spectrum but declines towards either end of the visible spectrum. If the centre wavelength is correctly chosen, the transmitted light maintains a good white colour balance. It may be necessary to adjust the balance between red, green and blue colour channels of the LCD 1 to ensure correct colour display in the 3D mode. Such colour balance change may, for example, be precalibrated and set in drivers for the 3D Image software or in the design of colour filters of the LCD to optimise between 2D and 3D colour spectra.

The curve shown in FIG. 13 for parallel polarisers is that which would have applied to the opaque barrier regions if the barrier regions 24 had rotated that polarisation. The centre wavelength of the system provides good extinction of light. However, towards the edges of the spectrum, the transmission substantially increases. In order to ensure cross talk levels of not more than 1%, the barrier must provide a 100:1 contrast ratio across the visible spectrum. As indicated by FIG. 13, this would not be achieved with parallel polarisers and polarisation rotators as the barrier regions 24.

Figure 14:
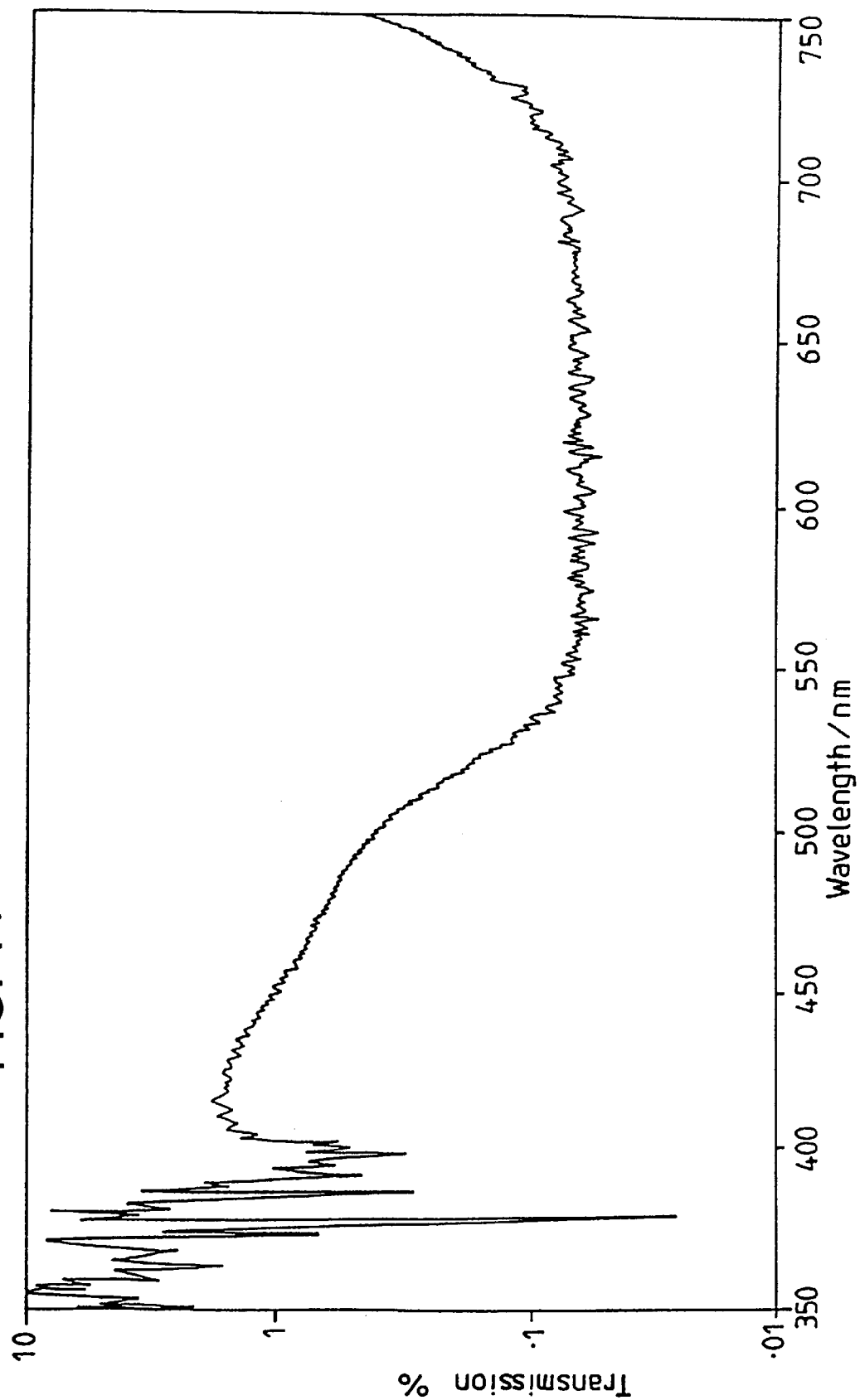
FIG. 14 is a graph of transmission of light in percent against wavelength in nanometers illustrating transmission of light through crossed polarisers.
Figure 15A:
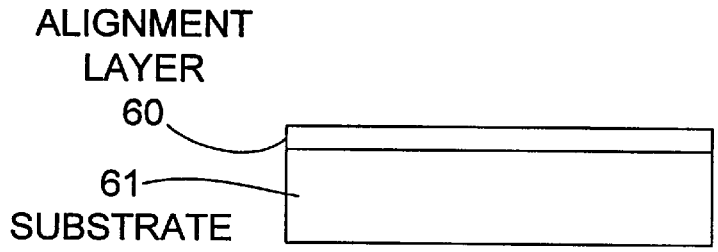
FIGS. 15(a) to 15(e) illustrates a first method of making a polarisation modifying layer.
Figure 15B:
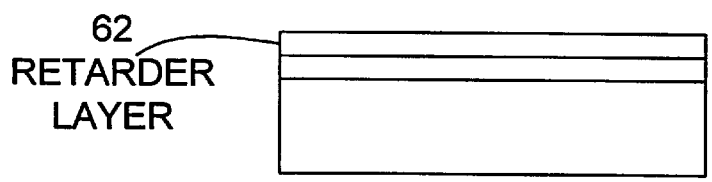
Figure 15C:
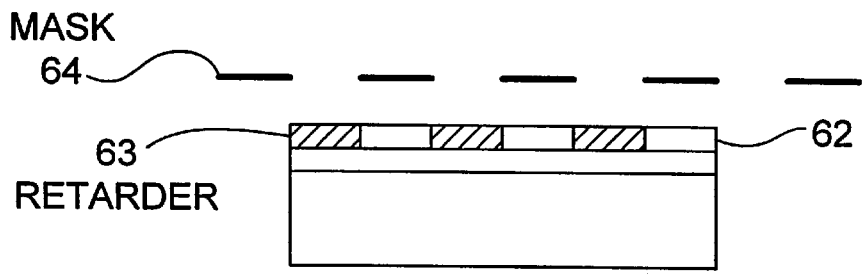
Figure 15D:
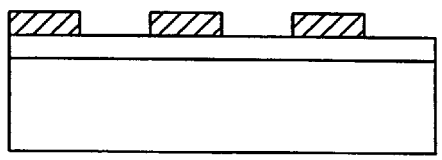
Figure 15E:
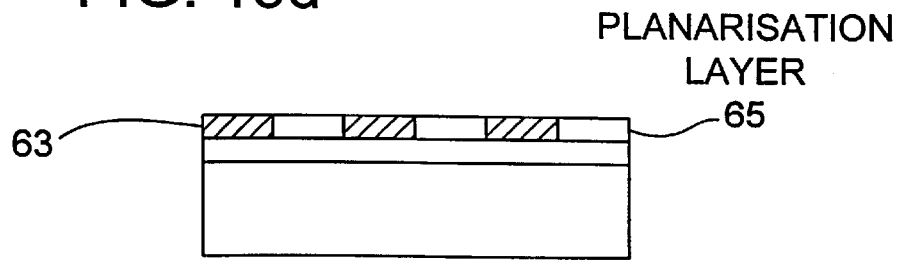
Figure 16A:
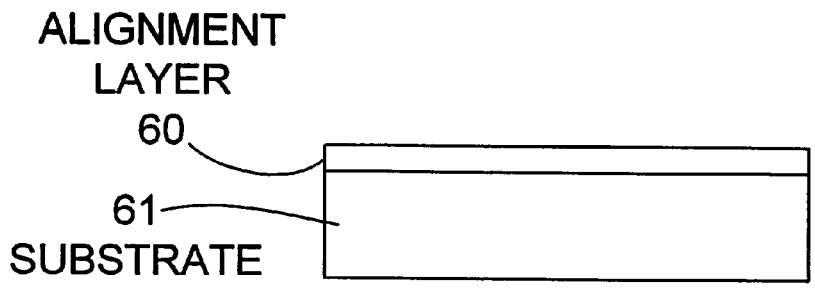
FIGS. 16(a) to 16(d) illustrates a first method of making a polarisation modifying layer.
Figure 16B:
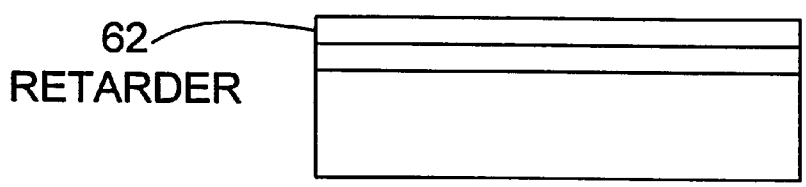
Figure 16C:
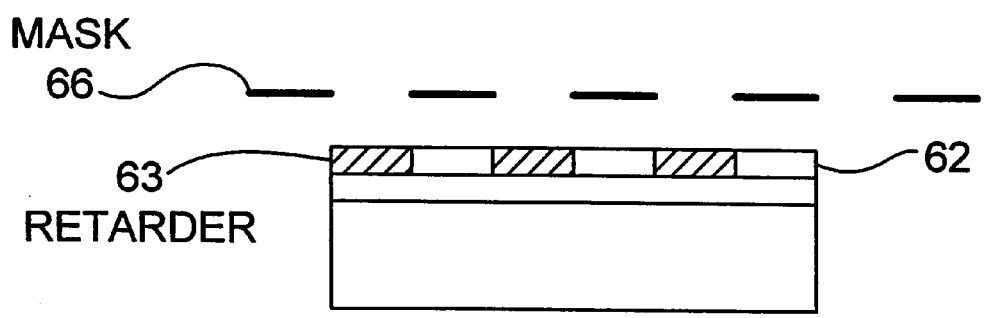
Figure 16D:
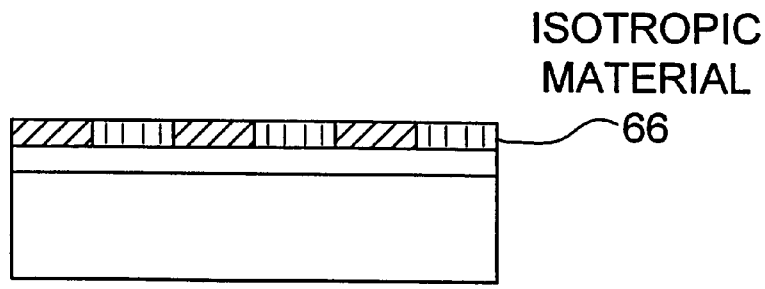
Figure 17A:
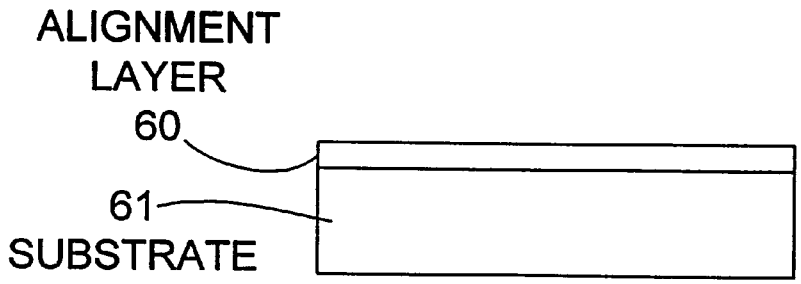
FIGS. 17(a) to 17(d) illustrates a first method of making a polarisation modifying layer.
Figure 17B:
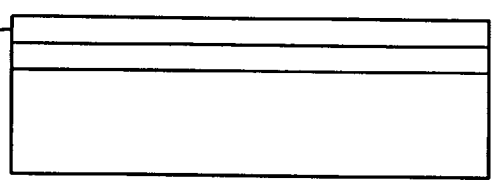
Figure 17C:
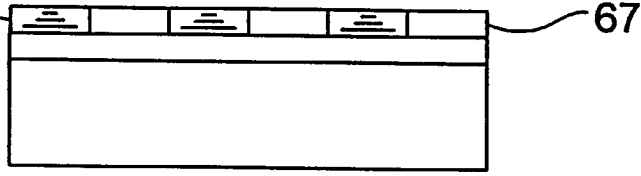
Figure 17D:
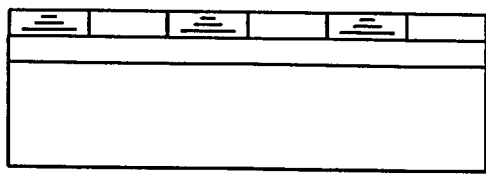
Figure 18A:
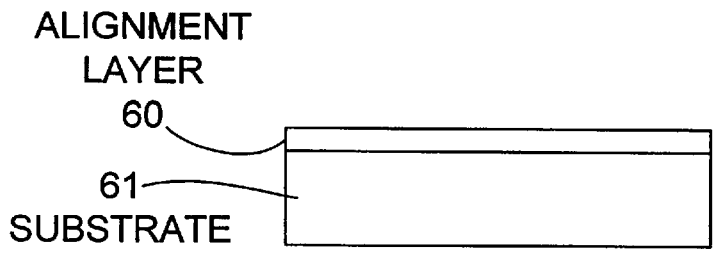
FIGS. 18(a) to 18(j) illustrates a first method of making a polarisation modifying layer.
Figure 18B:
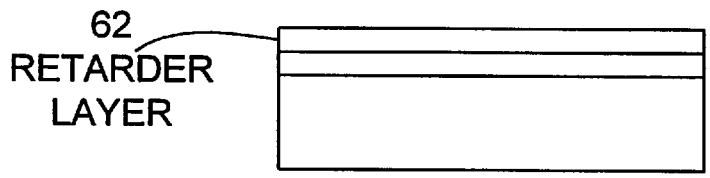
Figure 18C:
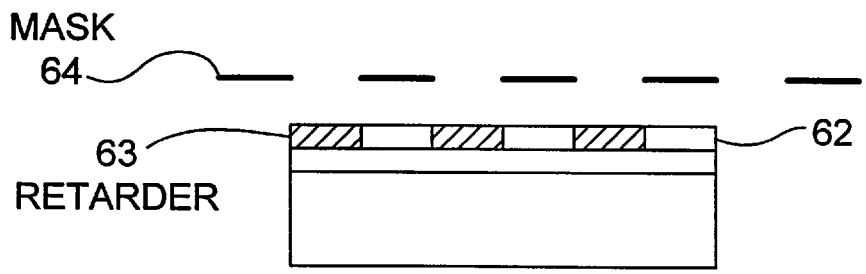
Figure 18D:
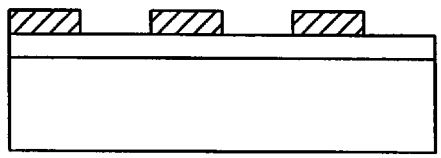
Figure 18E:
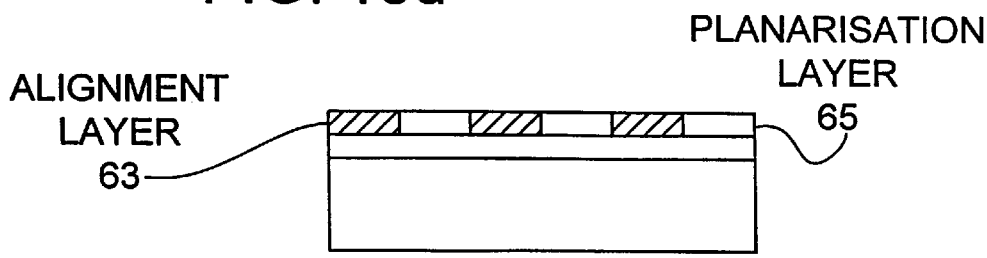
Figure 18F:
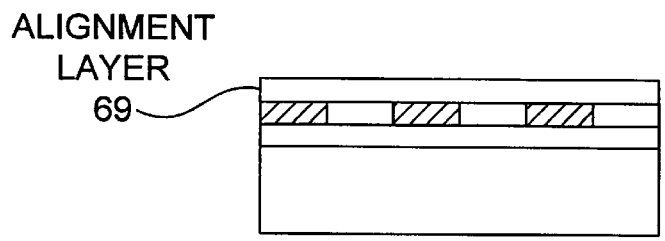
Figure 18G:
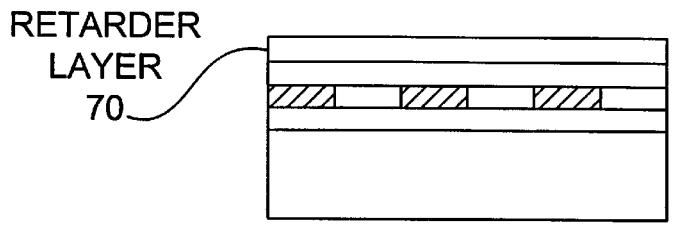
Figure 18H:
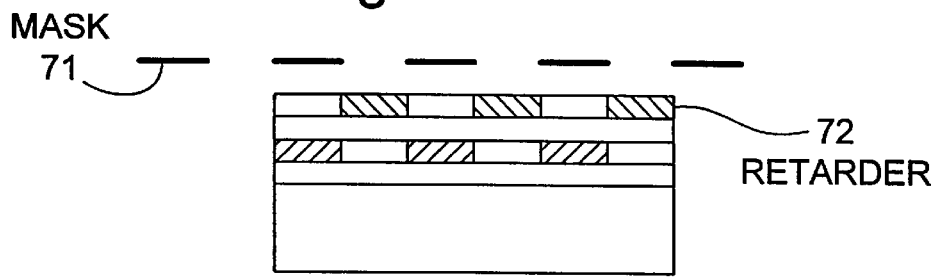
Figure 18I:
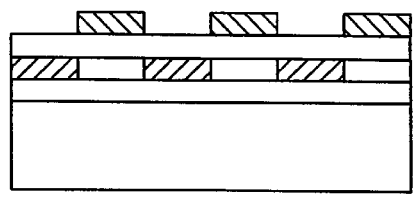
Figure 18J:
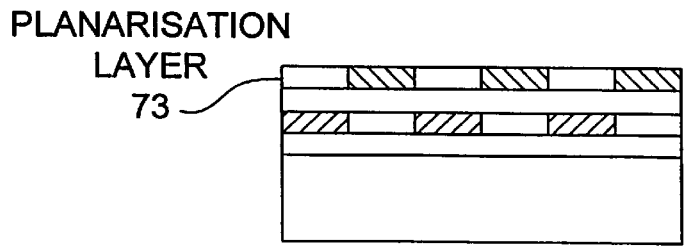

FIG. 14 illustrates the transmission performance through two crossed polarisers without any intermediate optical element. The extinction of light is substantially improved and the desired contrast ratio is achieved throughout the whole range of wavelengths from 450 to 750 nanometers. This arrangement with, for instance, waveplates creating the slit apertures and crossed polarisers defining the opaque regions of the barrier is therefore the optimum configuration for most applications.

The polarisation modifying layer 20 may be made, for example, by the deposition of a layer of reactive mesogen, such as RM257, which is patterned by standard photolithographic techniques into the slit structure. A convenient mask for etching is an existing parallax barrier.

FIG. 15 illustrates a method of making the polarisation modifying layer 20. In FIG. 15(*a*), an alignment layer 60 is applied to a substrate 61. The alignment layer 60 may, for instance, comprise rubbed polyimide, polyamide, or silicon oxide. FIG. 15(*b*) shows the application of an optical retarder layer 62 whose alignment direction is determined by the alignment layer 60. The retarder layer 62 comprises any suitable birefringent material which may be aligned and subsequently fixed in a pre-determined direction. A suitable material comprises a liquid crystal polymer or a reactive mesogen. An example of a suitable reactive mesogen is that known as RM257 (as mentioned hereinbefore) available from Merck UK having a high birefringence which allows the use of relatively thin layers. As shown in FIG. 15(*c*), regions 63 of the retarder layer 62 are exposed to ultraviolet radiation through a mask 64 so as to be photopolymerised. As shown in FIG. 15(*d*), the unpolymerised regions are then removed, for instance by an etching process, to reveal the desired patterned optical retarder arrangement.

The patterned retarder is then planarised by means of a planarisation layer 65. The layer 65 fills the gaps left by the removed unpolymerised retarder material as illustrated in FIG. 15(*c*). The material of the planarisation layer 65 is preferably isotropic, transparent and substantially similar in thickness to the retarders 63. Suitable materials include acrylic and epoxy resins.

The method of making the polarisation modifying layer 20 illustrated in FIG. 16 differs from that illustrated in FIG. 15 in that, after the selective polymerisation shown in FIG. 16(*c*), the unpolymerised retarder material 62 is not removed. The layer is heated to a temperature above the isotropic transition point of the unpolymerised retarder material, which is cured in an isotropic state by exposure to long wavelength ultraviolet radiation. This results in a layer having regions of isotropic material 66 and birefringent material 63 as illustrated in FIG. 16(*d*).

The method illustrated in FIG. 17 differs from that illustrated in FIG. 16 in that a chiral dopant is added to the reactive mesogen mixture before application as the retarder layer 67. The chiral dopant introduces a continuous rotation of the retarder direction on passing through the layer so as to provide a guiding twisted retarder. Selective polymerisation is performed as shown in FIG. 17(*c*).

FIG. 18 illustrates a method of making a retarder array which differs from that illustrated in FIG. 15 in that a further patterned retarder 72 is formed. After the planarisation layer 65 is applied as shown in FIG. 18(*e*), another alignment layer 69, for instance of the same type as the alignment layer 60, is applied, for instance in the same way. The alignment layer 69 is applied with an alignment direction different from that of the alignment layer 60. A further retarder layer 70, for instance of the same type as the retarder layer 62, is formed, for instance in the same way, on the alignment layer 69. The layer 70 is selectively exposed to ultraviolet radiation through a mask 71 so that regions 72 forming the further patterned optical retarder are photopolymerised. The unpolymerised regions are then removed as illustrated in FIG. 18(*i*) and a further planarisation layer 73 is formed as illustrated in FIG. 18(*j*). By using this technique, it is possible to provide alternate areas of retarders aligned in different directions for use as described hereinafter. By repeating the process steps illustrated in FIGS. 18(*b*) to 18(*e*), multiple stacked layers of patterned retarders may be fabricated.

FIG. 19 illustrates a method of making a retarder array which differs from that shown in FIG. 15 in that the standard alignment layer 60 is replaced by a layer of linearly photopolymerisable material 74, for instance of the type described in "Surface induced parallel alignment of liquid crystals by linearly polymerising photopolymers", Schadt et al, Japanese Journal of Applied Physics, vol 31 (1992), page 2155 and in EP 0 689 084. The layer is selectively exposed to radiation of a first linear polarisation through a mask 64 as shown in FIG. 19(*b*) to form exposed regions A. The unexposed regions B are then exposed by a mask 76 to radiation having a different linear polarisation. Thus, alternate regions of the alignment layer 28 provide different alignment directions, for example different by 45° or 90°. The retarder layer 62 is then applied as shown in FIG. 19(*d*) as described hereinbefore. However, the retarder layer adopts the alternate directions imposed by the underlying part of the alignment layer 75 and so does not require selective photopolymerisation. Instead, the retarder layer 62 may be cured by exposure to a uniform ultraviolet source.

Figure 22:
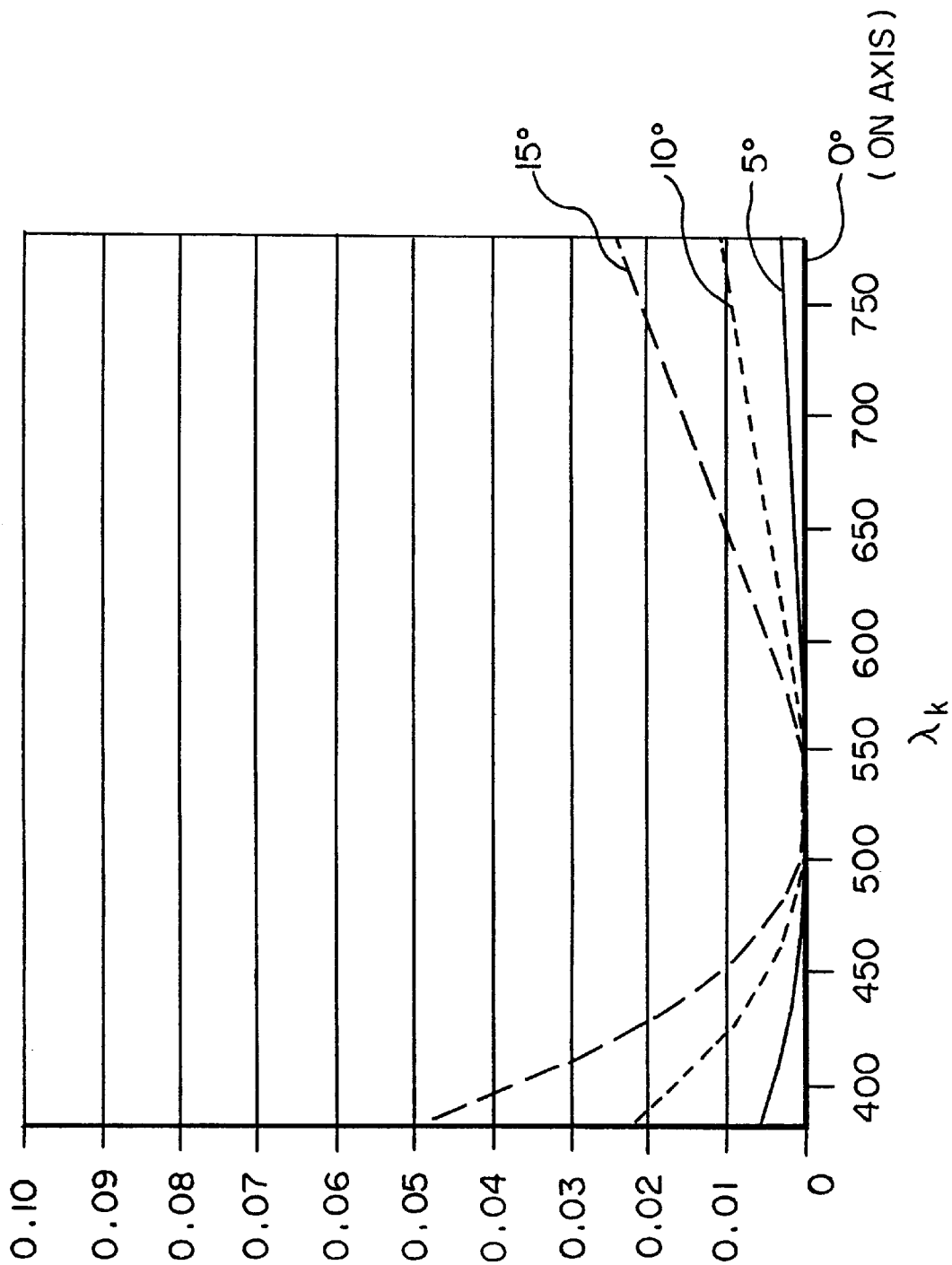
FIG. 22 is a graph of fractional transmission against wavelength in nanometers illustrating extinction of light through a system comprising crossed polarisers with two quarter waveplates disposed therebetween.

FIG. 20 illustrates a method of making a retarder array which differs from that shown in FIG. 15 in that the alignment layer 60 is rubbed twice. It is first rubbed in the direction A. Photoresist material 77 is applied and selectively polymerised through a mask 64 as shown in FIG. 20(*d*). This may be done using known photolithographic techniques. The unpolymerised material is removed leaving the polymerised photoresist material 78 and regions of the underlying alignment layer 60 exposed. The assembly is then rubbed in a second direction B to produce an alignment layer with a spatially varying alignment direction 79. A technique of this type is disclosed in "Four domain TN-LCD fabricated by reverse rubbing or double evaporation" Chen et al, SID95 Digest, pages 865 to 868. The photopolymerised photoresist material is then removed. The retarder layer 62 is then applied as shown in FIG. 22(*h*). However, the retarder layer adopts the alternate directions imposed by the underlying parts of the alignment layer 79 and so does not require selective photopolymerisation. Instead, the retarder layer 62 may be cured by exposure to a uniform ultraviolet source.

Alternative techniques for manufacturing the patterned polarisation modifying layer are disclosed in U.S. Pat. No. 2,647,440 and U.S. Pat. No. 5,537,144.

The polarisation rotation may be achieved by means of at least two physical effects. According to the first, polarisation rotation is provided by an optical retarder which employs a birefringent material. Such a material is characterised in that the refractive index for light propagating in the material depends on the orientation of the polarisation with respect to the optic axis of the material. The optic axis is set by molecular or crystalline structure of the material. In the case of a uniaxial birefringent material, there is one refractive index for light propagating with a plane of polarisation parallel to the optic axis and another refractive index for light propagating with a plane of polarisation perpendicular to the optic axis. Light with a plane of polarisation between these may be considered as a sum of these polarisations without loss in generality. If the material is given a thickness t such that light of wavelength $\lambda$ suffers a phase delay of $\pi$ between the fast and slow polarisations, then the element is termed a "half waveplate" or "$\lambda/2$ plate". The thickness is then given by:

$$t=(2m+1)\lambda/(2\Delta n)$$

where $\Delta n$ is the difference between the two refractive indices and m is an integer.

Plane polarised light incident on such an optical element undergoes a rotation in the plane of polarisation of twice the angle between the incident plane of polarisation and the optic axis of the material. Thus, if a half waveplate is oriented at 45 degrees to the incident plane of polarisation, the light exits the element with a 90 degree change in the plane of polarisation.

A second physical effect is that produced by a polarisation rotator. Such an element, which may be embodied by a reactive mesogen with a chiral dopant, comprises a material which is birefringent in any one thin slice but in which the angle of the optic axis rotates in a defined manner between slices to describe a spiral. Such an optical element causes polarisation rotation by guiding and can be made to rotate an incident plane of polarisation through 90 degrees for a broad range of wavelengths.

The rotation of the polarisation may further be provided by a combination of these two effects, for instance in order to optimise device performance.

The tolerance of the angular alignment of the polariser sheet 21 with respect to the LCD 1 is determined by the level of light leakage which may be tolerated through the opaque regions of the parallax barrier. Such leakage must be very low and preferably less than 1%. The extinction of light from two perfect crossed polarisers with an angle $\theta$ between their axes is given by:

$$|(\theta)-|(0) \cos^2(\theta)$$

The rotational angles for 1% of light leakage are given by the solutions to the equation $|(\theta)/|(0)>0.01$ and the angles are $\theta=84.3°, 95.7°$. Thus, there is a tolerance of approximately plus and minus 5 degrees about the ideal value of 90 degrees. Such an angular tolerance can easily be achieved by simple mechanics or alignment by eye against a reference mark.

Figure 21:
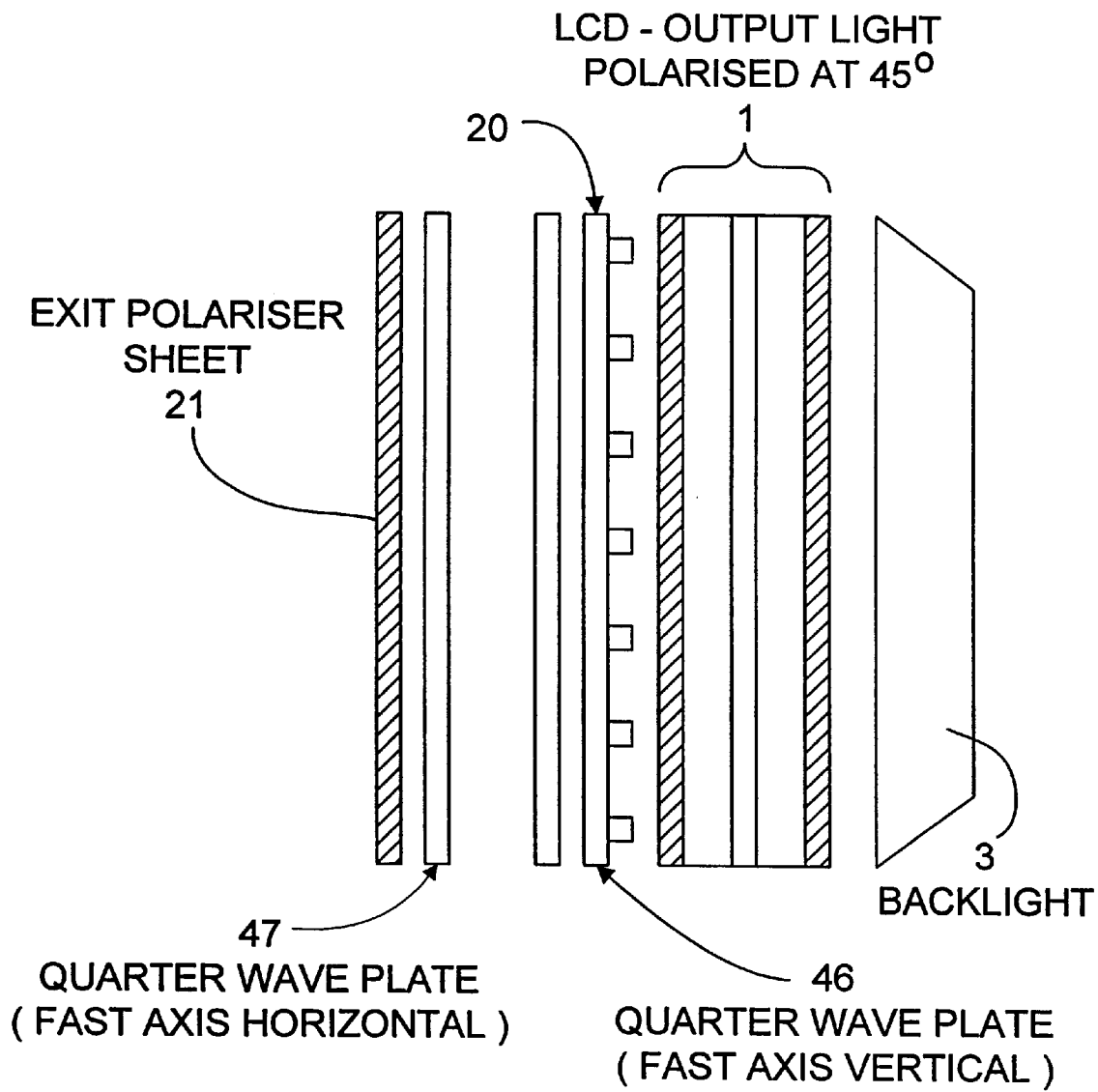
FIG. 21 is a diagrammatic plan view of an autostereoscopic 3D display constituting another embodiment of the invention.

FIG. 21 illustrates a front parallax barrier type of display in which the parallax barrier is modified by the provision of a quarter waveplate 46 fixed to the layer 20 with its fast axis vertical and a quarter waveplate 47 fixed to the polariser sheet 21 with its fast axis horizontal. The polarising directions of the polariser sheet 21 and an output polariser 48 of the LCD 1 are at minus and plus 45 degrees, respectively.

The quarter waveplate 46 converts the linearly polarised light from the layer 20 to circularly polarised light. Similarly, the quarter waveplate 47 converts the circularly polarised light back to linearly polarised light. With such an arrangement, the angular alignment tolerance can be substantially relaxed. In practice, quarter waveplates are only "perfect" at their design wavelength. At other wavelengths, the retardance within the plate is not correct to generate perfect circular polarisation and an elliptical state results. However, if the two quarter waveplates 46 and 47 are arranged such that their optical axes are mutually orthogonal, then the inaccuracy in retardance of one plate is substantially cancelled by the inaccuracy in the other plate.

As the polariser sheet 21 and the quarter waveplate 47 are rotated about an axis substantially normal to the display surface, the cancellation of imperfection of the quarter waveplates 46 and 47 breaks down and the non-perfect nature of these plates becomes apparent. FIG. 22 illustrates the extinction of light through the barrier regions 24 using this arrangement and for relative angular rotations of 0, 5, 10 and 15 degrees. Transmission below 1% for the majority of the visible spectrum can be achieved for angular displacements up to 10 degrees. Thus, an alignment tolerance or plus or minus 10 degrees can be achieved and is twice that which is available when the quarter waveplates 46 and 47 are omitted.

Figure 23:
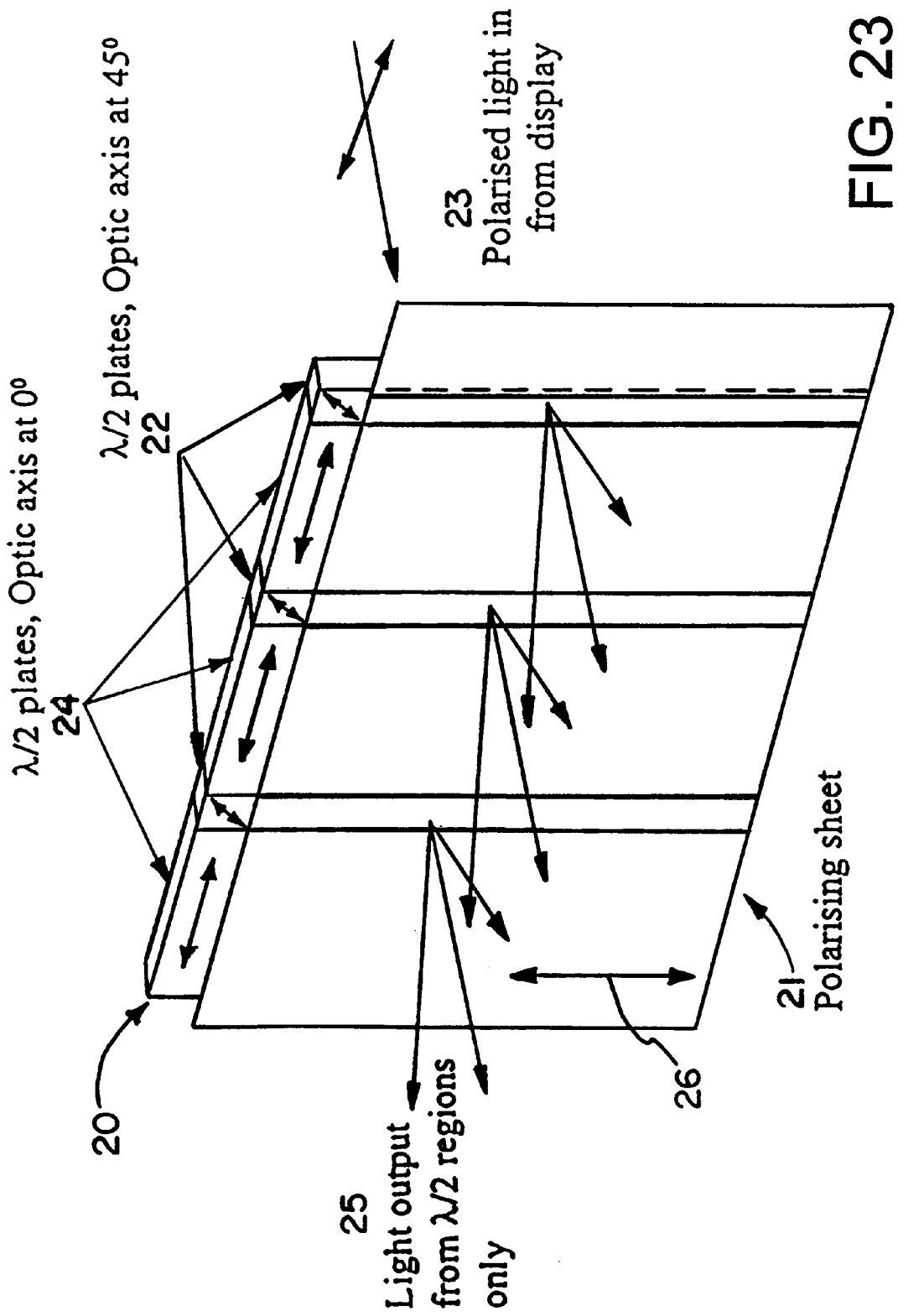
FIG. 23 is a diagrammatic view of a parallax barrier constituting another embodiment of the invention.

FIG. 23 illustrates another parallax barrier which differs from that shown in FIG. 5 in that the polarisation modifying layer 20 comprises a patterned retarder. The patterned retarder may be made, for instance, by any of the methods illustrated in FIGS. 18 to 20 and described hereinbefore. The aperture regions 22 comprise $\lambda/2$ plates whose optic axes are aligned at 45° to the polarisation direction of the light 23. The barrier regions 24 comprise $\lambda/2$ plates whose optic axes are aligned at 0° to the polarisation direction of the light 23. Thus, the polarisation of the light 23 passing through the barrier regions 24 is not affected and the light is extinguished by the polarising sheet 21. The polarisation of the light 23 passing through the aperture regions 22 is rotated by 90° and the light therefore passes through the polarising sheet 21. Thus, in the 3D mode, the device functions as a parallax barrier as described hereinbefore.

An advantage of the parallax barrier shown in FIG. 23 is that the patterned retarder forming the layer 20 is planar so that there is substantially no phase step for light passing through the regions 22 and 24 of the layer 20. Diffraction effects are therefore reduced so that there are substantially no variations in illumination uniformity or flicker in the illumination as an observer moves with respect to the display.

Diffraction effects may also be reduced by planarisation of the layer, for instance as illustrated in FIGS. 15 to 17.

Figure 24:
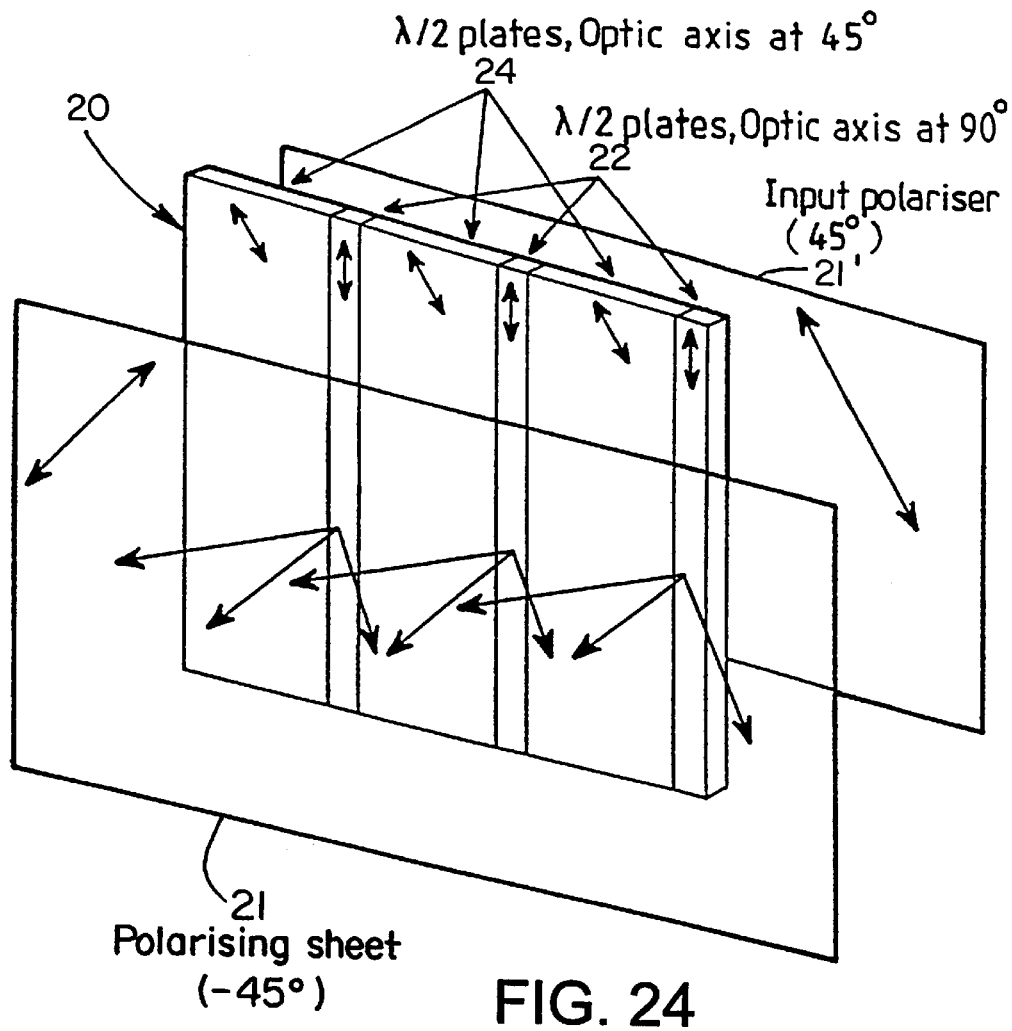
FIG. 24 is a diagrammatic view of a parallax barrier constituting another embodiment of the invention.
Figure 25:
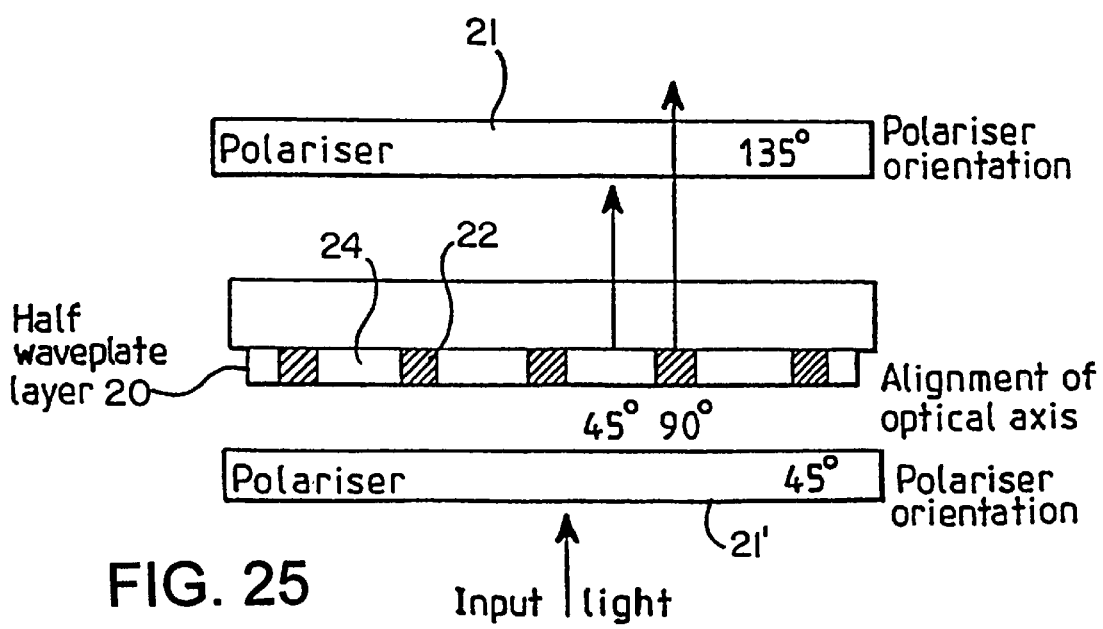
FIG. 25 is a plan view of the parallax barrier of FIG. 24.

The parallax barrier shown in FIGS. 24 and 25 differs from that shown in FIG. 23 in that the polarisation vectors and the optic axes are rotated by 45°. An input polariser 21', which may comprise the output polariser of an associated LCD, has its polarisation axis oriented at 45°. This is typical of LCD output polarisers, for instance of the twisted nematic type. The optic axes of the aperture regions 22 are oriented at 90° whereas the optic axes of the barrier regions 24 are aligned at 45° so as to be parallel to the polarisation vector of light from the input polariser 21'. The polarising sheet 21 has its polarising axis oriented at −45° so as to be orthogonal to the polarising axis of the input polariser 21' (45° is optically equivalent to +135° as indicated in FIG. 25).

Figure 26:
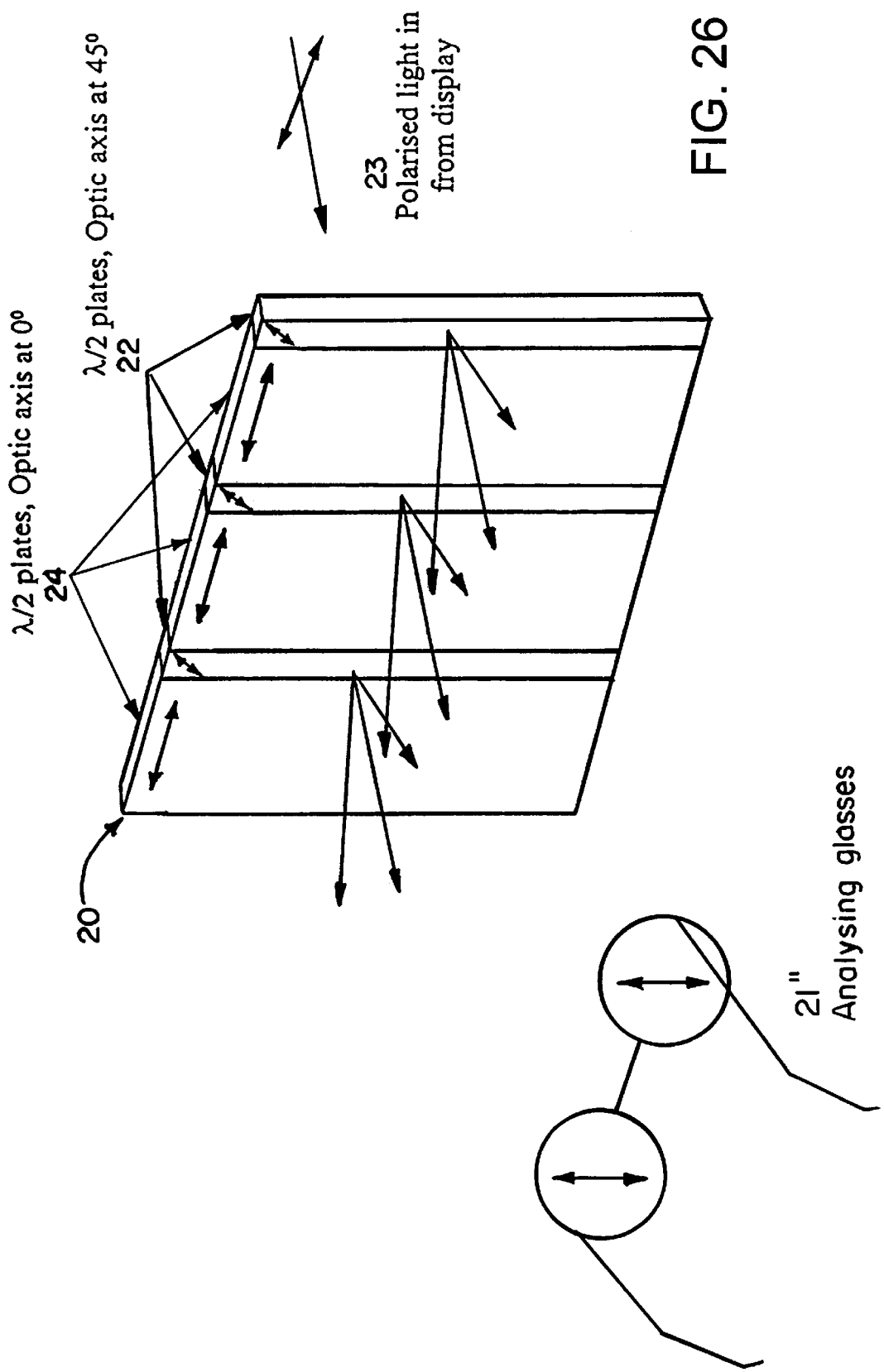
FIG. 26 is a diagrammatic view of an arrangement constituting another embodiment of the invention.

FIG. 26 illustrates an arrangement in which the polarising sheet 21 is omitted and the polarising function is provided by analysing glasses 21" worn by an observer. The glasses 21" comprise polarising lenses with the polarising axes oriented at 90° so as to be orthogonal to the polarisation vector of the polarised light 23. However, the polarising axes and the optic axes may be rotated to any desired angle provided the angular relationships are maintained. Such an arrangement allows the use of conventional polarising sunglasses, which may be removed to allow the display to be viewed in the 2D mode.

Another important manufacturing issue is the matching of the viewing angle of the layer 20 and, when present, the plate 80 to the LCD 1. When viewed from off-axis positions, light reaching the eyes of the observer travels obliquely through the layer 20. Such oblique light rays experience slightly different polarisation conditions because of their different orientation within the birefringent layers and the different layer thicknesses. Contrast and colour performances of LCDs degrade with increasing viewing angle. The aperture regions 24 of the barrier may also experience colour and transmission changes with off-axis viewing. It is therefore desirable for waveplate layer thicknesses to be chosen so as to give uncoloured transmission for the widest range of angles. Furthermore, the pre-tilt of reactive mesogens or liquid crystals, if used to fabricate the waveplates, should be carefully chosen for the same reason.

In order to improve the performance of the elements performing the rotation of polarisation when such elements are embodied as birefringent retarders, they may be fabricated as two or three layers of retarder of specific thicknesses and relative optic axis angles. Combinations of waveplates for broadband performance are disclosed for example in Proc. Ind. Acad. Sci, vol. 41, No. 4, section A, pp. 130, S. Pancharatnam "Achromatic Combinations of Birefringent Plates", 1955.

Figure 27:
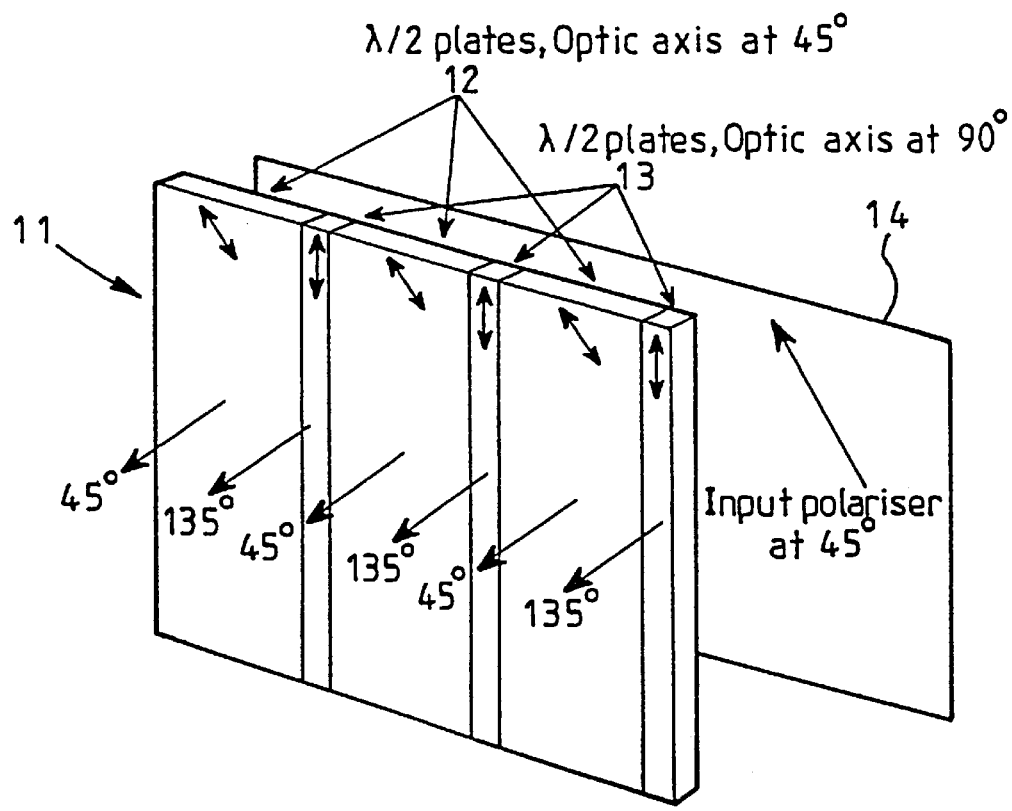
FIG. 27 illustrates an optical element and an optical device constituting embodiment of the invention.

FIG. 27 shows a passive polarisation modulating optical element 11 comprising a layer of birefringent material having substantially fixed birefringence. The thickness and birefringence of the layer are such that it acts as a half waveplate but with different regions acting as retarders with optic axes oriented in different directions. In particular, the element 11 has first retarders 12 and second retarders 13. The retarders 12 and 13 and 13 comprise parallel vertical strips formed within the layer and alternating with each other. The strips 12 are of the same width and have their optic axis aligned at 45° with respect to a reference direction. The strips 13 are of the same width and have their optic axes aligned at 90° to the reference direction.

The optical element 11 shown in FIG. 27 co-operates with an input polariser 14 to form an optical device. The input polariser 14 may, for example, comprise an output polariser of a liquid crystal device. The input polariser 14 supplies linearly polarised light whose polarisation vector is at 45° to the reference direction.

The polarisation vector of the light from the polariser 14 is parallel to the optic axes of the retarders 12, which therefore have substantially no effect on the polarisation vector. Accordingly, light leaving the retarders 12 has its polarisation vector at 45° to the reference direction. The optic axes of the regions 13 are aligned at 45° to the polarisation vector of the input light. Accordingly, the retarders 13 behave as half waveplates and rotate the polarisation vector of light through 90° so that the output light from the retarders 13 has its polarisation vector at 135° to the reference direction.

Figure 28:
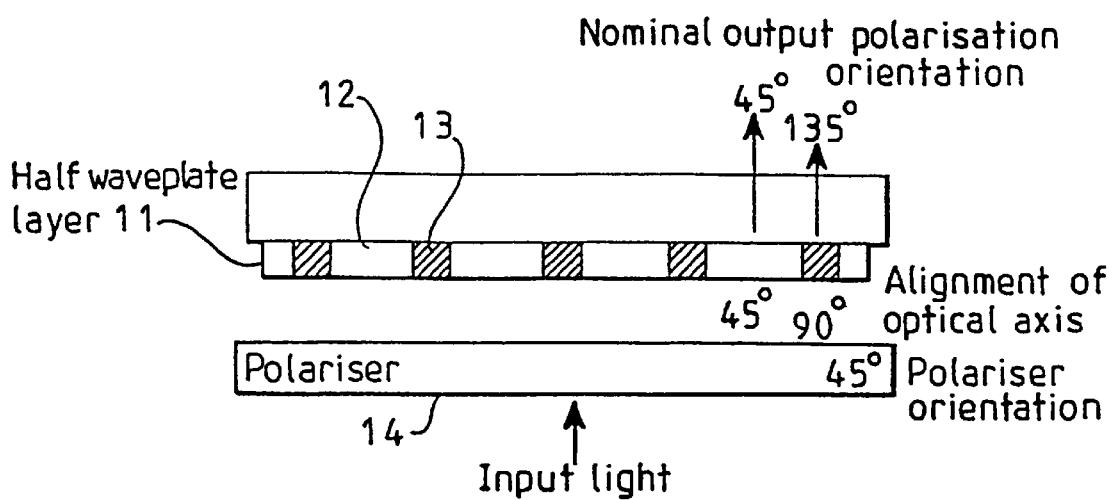
FIG. 28 is a plan view of the element and device of FIG. 27.
Figure 29:
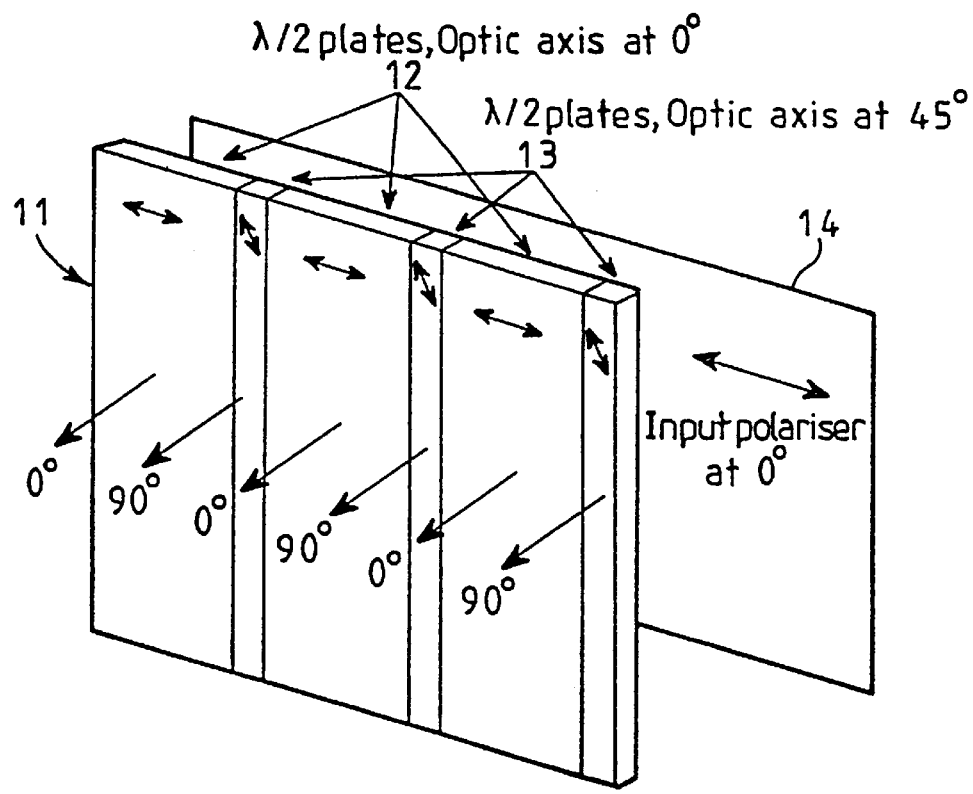
FIG. 29 illustrates an optical element and an optical device constituting another embodiment of the invention.
Figure 30:
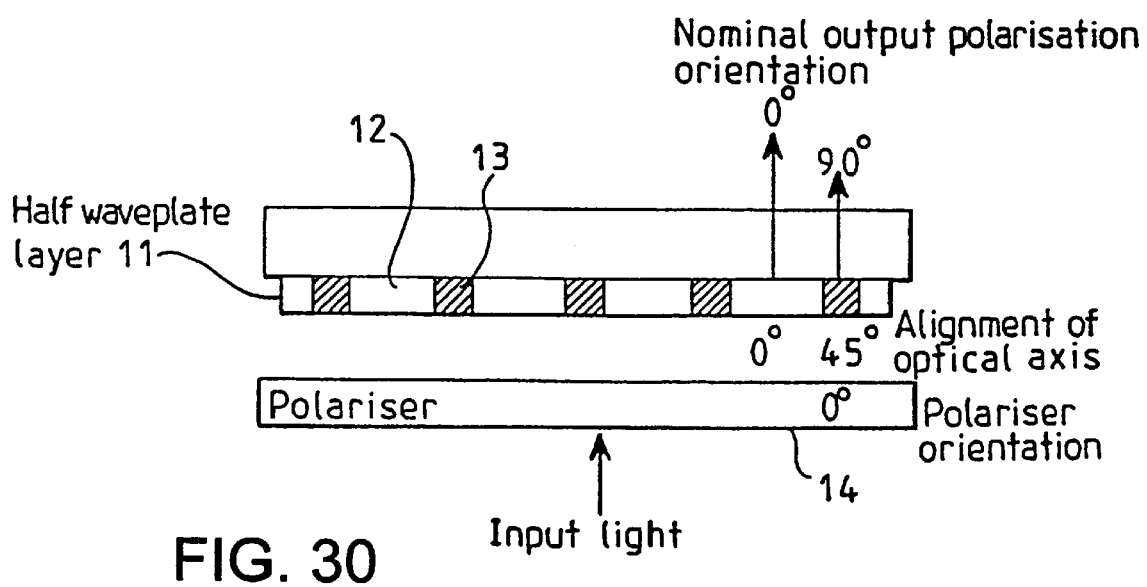
FIG. 30 is a plan view of the element and device of FIG. 29.

FIGS. 29 and 30 illustrate an arrangement which differs from that shown in FIGS. 27 and 28 in that the optic axes of the element 11 and the polarising direction of the polariser 14 are rotated through 45°. Thus, the polarisation vector of the light from the polariser 14 is at 0°, as is the light leaving the retarders 12, whereas light leaving the retarders 13 has its polarisation vector rotated to 90°.

Figure 31:
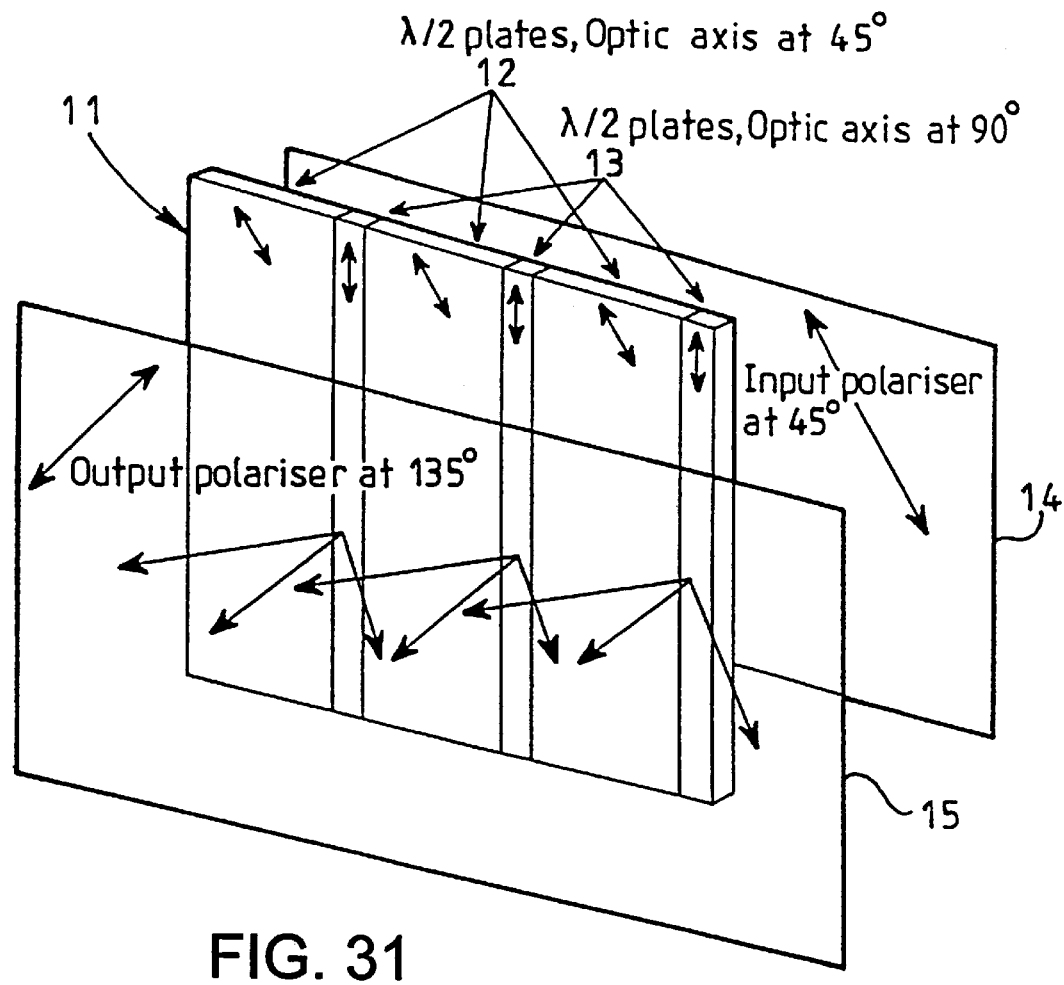
FIG. 31 illustrates an optical element and an optical device constituting a further embodiment of the invention.
Figure 32:
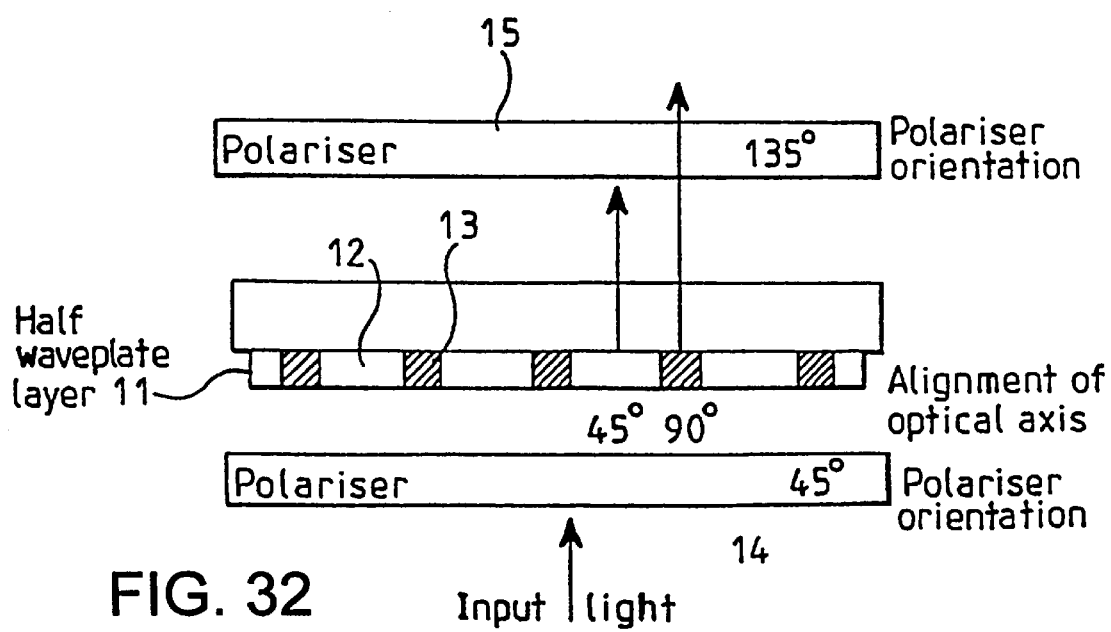
FIG. 32 is a plan view of the element and device of FIG. 31.

FIGS. 31 and 32 illustrate an optical device of the type shown in FIGS. 27 and 28 co-operating with an output polariser 15 to form a parallax barrier. The polarising direction of the output polariser 15 is orthogonal to that of the input polarised 14. The polariser 15 therefore substantially extinguishes light passing through the retarders 12 but passes light leaving the retarders 13.

Figure 33:
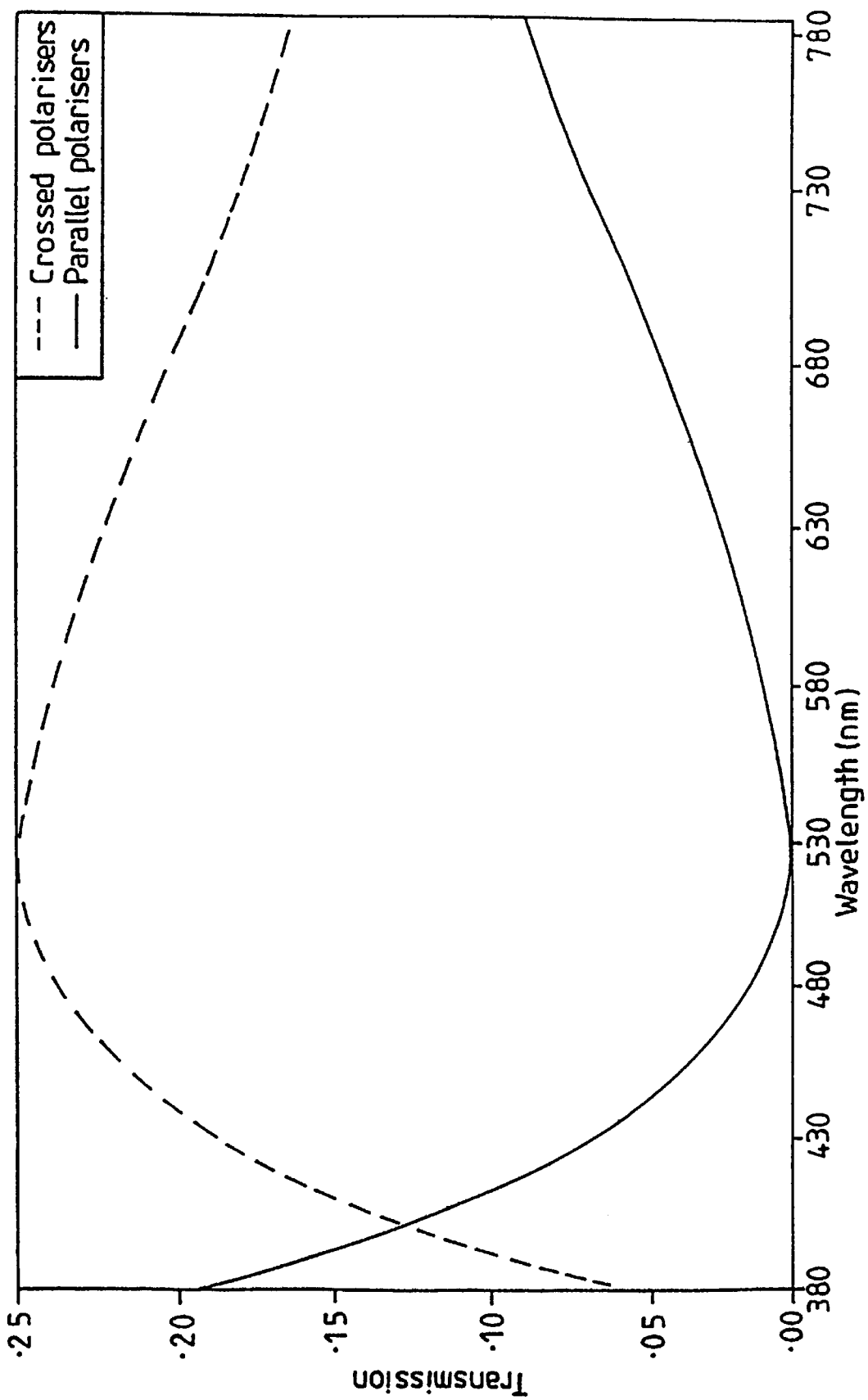
FIG. 33 illustrates graphs of transmission in arbitrary units against wavelengths in nanometers for a half wave retarder disposed between crossed and parallel polarisers.

The polarisation rotation performed by the retarders 13 does not generally work optimally over the whole of the visible spectrum. Thus, some parts of the visible spectrum are transmitted less than others. FIG. 33 illustrates the calculated transmission of unpolarised light through the device shown in FIGS. 31 and 32 with the element 11 made of a uniaxilly birefringent material known as RM257 available from Merck (UK). With the polarising axes of the polarisers 14 and 15 orthogonal, transmission is highest by design at the centre of the visible spectrum but declines towards either end of the visible spectrum. If the centre wavelength if correctly chosen, the transmitted light maintains a good white colour balance.

FIG. 33 illustrates the performance for a device of the type shown in FIGS. 31 and 32 but with the polarising axes of the polarisers 14 and 15 parallel to each other and the optic axes of the retarders 12 and 13 interchanged. In this case, extinction of light through the retarders 12 relies on broad band half waveplate performance. The centre wavelength provides good extinction of light but the transmission substantially increases towards the edges of the spectrum. In order to ensure cross talk levels of not more than 1%, the parallax barrier in an autostereoscopic display must provide a 100:1 contrast ratio across the visible spectrum. As illustrated in FIG. 33, this would not be achieved with parallel polarisers and polarisation rotators acting as barrier regions between slit regions of the parallax barrier.

Figure 34:
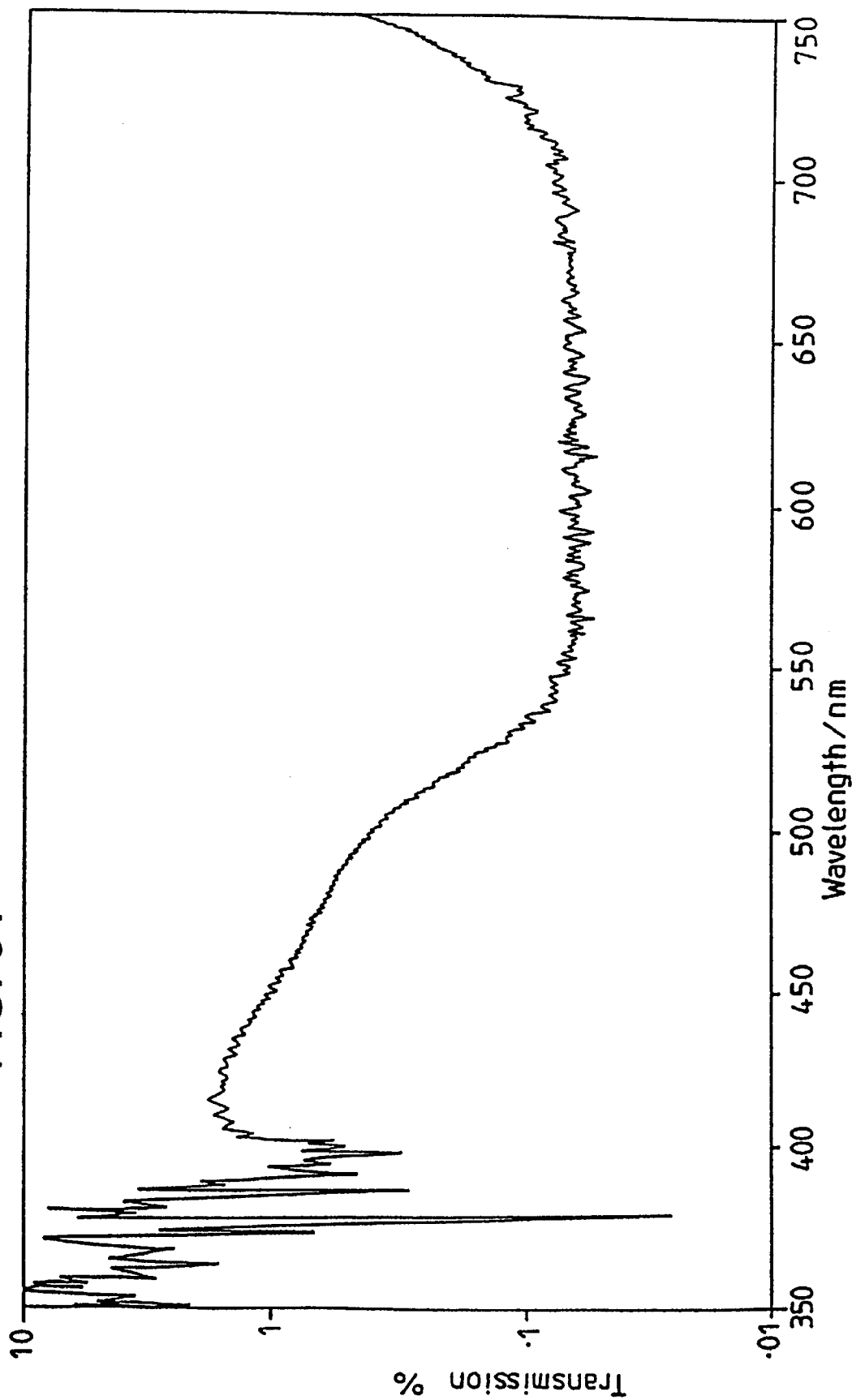
FIG. 34 is a graph of transmission in per cent against wavelength in nanometers of two crossed polarisers without any intermediate optical element.
Figure 37A:
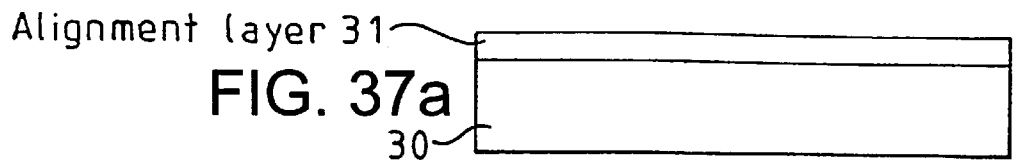
FIG. 37 comprises FIGS. 37a to 37i and illustrates a method of making an optical element constituting an embodiment of the invention.
Figure 37B:
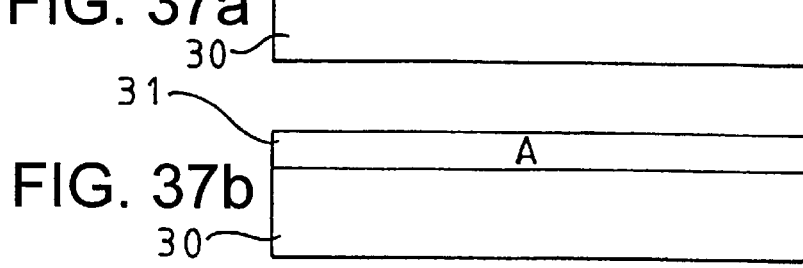
Figure 37C:
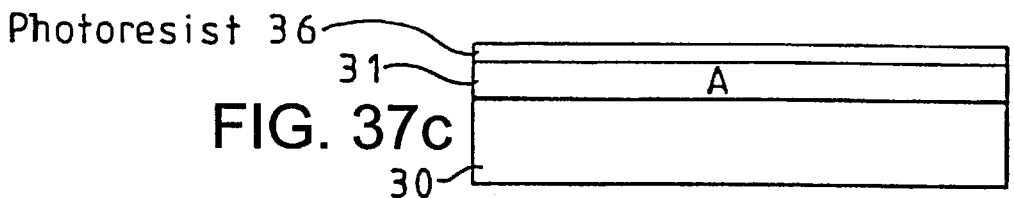
Figure 37D:
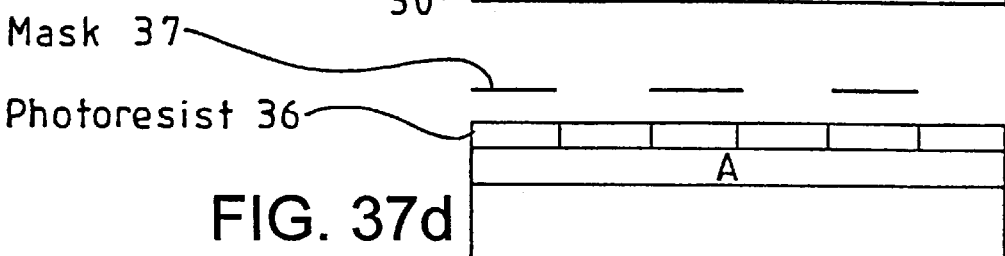
Figure 37E:
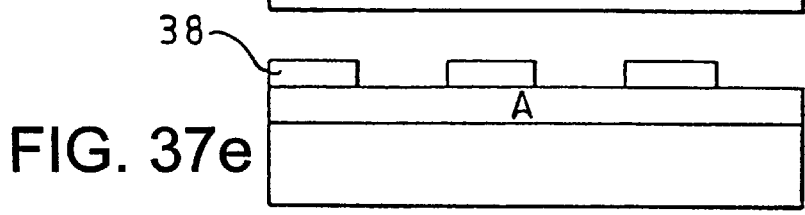
Figure 37F:
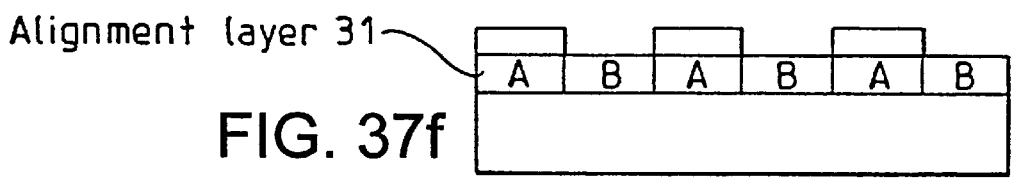
Figure 37G:
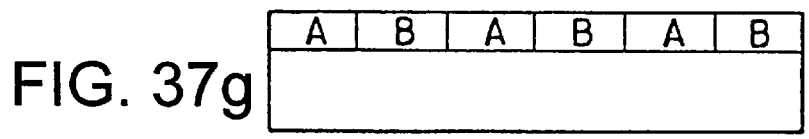
Figure 37H:
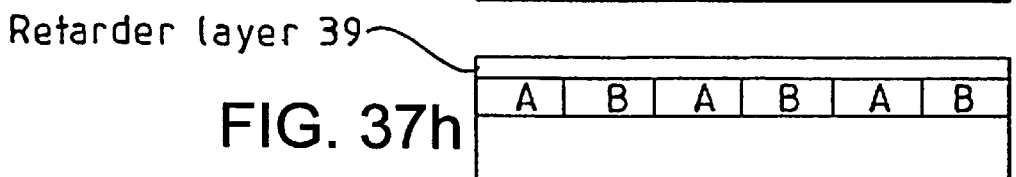
Figure 37I:
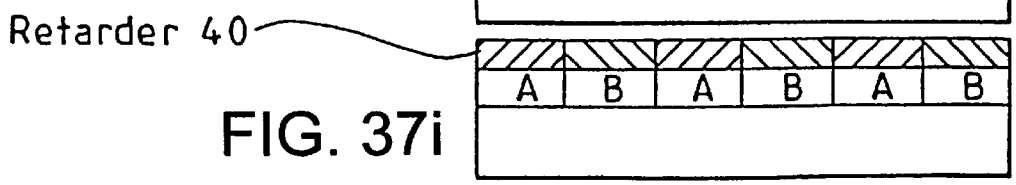

FIG. 34 illustrates the transmission performance through two cross polarisers without any intermediate optical element. The extinction of light is substantially improved and the desired contrast ratio is achieved throughout the whole range of wavelengths from 450 to 750 nanometers. This corresponds to the arrangement illustrated in FIG. 31 because the retarders 12 have their optic axes aligned with the polarisation vector of the input light and therefore have substantially no effect on the polarisation vector. In general, such an arrangement is preferable because it is capable of meeting the contrast ratio requirements of a parallax barrier. However, in applications where achromaticity of the transmitted light is more important than contrast ratio and achromatic extinction of light, an arrangement of the type shown in FIGS. 31 and 32 but with the output polariser axis rotated by 90° may be preferable.

The element 11 may be bonded to the input polariser 14 so as to allow accurate tolerancing of relative tilts of the strip-shaped retarders 12 and 13 and the pixel structure of an LCD of which the polariser 14 is a part. This also allows index matching of the interface so as to reduce reflections within the device. Examples of suitable materials which fulfil the requirements of the high transparency, achromaticity and thermal expansion similar to the polariser 14 and the element 11 include organic adhesives such as epoxy resins, acrylic polymers and those based on polyurethane adhesives.

The device illustrated in FIGS. 31 and 32 may be used as the parallax barrier 1 of the autostereoscopic 3D display shown in FIG. 1. The retarders 13 then act as slits of the parallax barrier whereas the retarders 12 act as the opaque regions between the slits.

When viewed from off-axes positions, light reaching the eye of an observer travels obliquely through the layer forming the element 11. Such oblique light rays experience slightly different polarisation conditions because of their different orientation within the birefringent layer and the longer propagation path through the layer. Light through the barrier slits may therefore experience colour and transmission changes with off-axis viewing. However, the image contrast is substantially unaffected by viewing angle performance of the parallax barrier. For 3D displays using LCDs as the SLM, the viewing angle performance may be configured to give minimum visibility of chromaticity of the white state. In some arrangements, it may be that the colouration variations tend to be worse in a direction parallel to the alignment direction of the barrier slits. Similarly, the LCD may have a viewing angle performance which is configured so that the most limited viewing direction is generally in the vertical direction. For the LCD, off-axis viewing causes degradation of contrast and colouration of the display. Thus, if the worst viewing angle of the retarder is aligned with the worst viewing angle of the SLM, the performance of the parallax barrier can be disguised by the worse image appearance of the SLM.

The retarders 12 and 13 are formed in a single layer whose optical properties, apart from optic axes, are uniform throughout the layer. Further, the layer may be of substantially constant thickness. Such an arrangement allows the layer 11 to be bonded to other layers without an air gap and without the need for planarisation.

The viewing freedom of the 3D image is partly determined by the alignment of the barrier slits with the pixels of the LCD in the display shown in FIG. 1. Tilting of the barrier slits with respect to the LCD causes a fringe misalignment which results in loss of viewing freedom and potentially areas of image cross talk on the display. This causes increased visual stress for an observer and is thus undesirable. By forming the layer 11 in contact with the polariser 14, such tilts can be substantially avoided. In particular, techniques exist for providing the desired alignment and, by forming the layer 11 integrally with the associated LCD or other device, accurate alignment can be provided during manufacture and is not substantially affected by environmental conditions, such as mechanical shocks and changes in temperature.

In order to operate a display of the type shown in FIG. 1 in the 2D mode, the output polariser 15 may be removed or otherwise disabled. In this mode, it is desirable for the patterned structure of the optic axes of the element 11 to be invisible. For instance, the retarders 12 and 13 should have the same light absorption performance in order to avoid the visibility of Moire beating with the LCD structure. Another artefact which should be avoided is diffraction from the phase structure of the parallax barrier. Such diffraction may beat with the pixel structure of the LCD to give some low contrast Moire interference effect. With the optical element 11, the diffraction efficiency of the phase structure is substantially reduced compared with known arrangements. For instance, the orthogonal linear polarisation states in the light from the retarders 12 and 13 do not substantially interfere with each other. The phase step between the retarders 12 and 13 is minimised because the retarders are formed in the same material with substantially the same refractive index.

FIG. 35 illustrates another technique for reducing the levels of diffraction. During manufacture of the optical element 11 as described in more detail hereinafter, a mask having the appearance shown at 20 is used to define one of the alignment layer orientations shown at 21 in order to form the element. The parallax barrier slits are therefore defined by non-straight boundaries. Instead, the boundaries are of sine wave shape. This results in a plurality of different diffraction structures because of the different aspect ratios so that the diffraction effects are blurred. This structure also allows some vertical blurring of the diffraction structure. However, care should be taken to minimise beating of the diffraction structure vertically with the vertical pixel structure.

FIG. 36 illustrates a first method of making the optical element 11. The element is made on a substrate 30 on which an alignment layer 31 is formed, for instance by spin coating. The alignment layer comprises a linearly photopolymerisable material, such as that described in "Surface Induced Parallel Alignment of Liquid Crystals by Linearly Polymerised Photopolymers", Schadt et al, Japanese Journal of Applied Physics, vol 31 1992, p 2155 and in EP 0 689 084. The alignment layer 31 is exposed to radiation of a first linear polarisation through a mask 32 to form exposed regions A. The unexposed regions of the layer 31 are then exposed through a mask 33 to radiation having a different linear polarisation to form the exposed regions B. Thus, alternate regions of the alignment layer 31 provide different alignment directions, for example differing by 45° to 90°. The alignment layer 31 is then covered by a retarder layer 34, for instance by spin coating. The retarder layer 34 comprises any suitable birefringent material which may be aligned and subsequently fixed in a predetermined direction. A suitable material comprises a reactive liquid crystal polymer containing a diacrylate and/or a monoacrylate. An example of a suitable material is known as RM257 from Merck (UK). The retarder layer 34 is then fixed or polymerised, for instance by exposure to ultraviolet radiation, so as to form the fixed retarder 35.

The optic axis of the retarder layer 34 adopts the alternate directions imposed by the underlying parts of the alignment layer 31 and so does not require selective polymerisation. Also, there is no removal of the retarder material during processing, which allows remote exposure from a broad area source and avoids the risk of sticking of the retarder material to a mask.

The structure 30 is selected so as to minimise any birefringence which would otherwise affect the performance of the optical element, for instance reducing contrast ratio or degrading the chromatic performance of a device. For instance, the substrate 30 may be a suitable float glass of appropriate flatness so as not to distort the fringe structure in the case of a 3D display when the optical element is disposed at or near the polariser 14.

FIG. 37 illustrates a second method of making the optical element. The substrate 30 is coated, for instance by spin coating, with a polyimide alignment layer 31. The polyimide may comprise a material known as PI2555 available from Du Pont dissolved in 1:20 in a solvent comprising a mixture of N-mthyl-2-pyrrolidine and 1-methoxypropan-2-ol known as T9039 and also available from Du Pont. For instance, the layer 31 is formed by spinning in an open bowl spin coater at 4000 rpm for 30 seconds. The polyimide layer 31 is then cured by heating at 170° centigrade for two hours. Alternatively, the alignment layer may be silicon oxide depending on the requirement of the reactive mesogen effect for pre-tilt. The alignment layer 31 is rubbed with a soft cloth so as to impose a preferred direction and pre-tilt on the alignment layer, as indicated at A.

A layer 36 of photo-resist is formed on the alignment layer 31, for instance by spin coating. The photo-resist 36 is selectively exposed through a mask 37, for instance in the form of a chrome copy of a desired parallax barrier so that, following exposure through the mask 37, the photo-resist covers areas of the optical element which are intended to form the opaque regions between the parallax barrier slits. The unexposed photo-resist is then removed.

The element is then re-rubbed so as to introduce a second different alignment of the alignment layer, for instance at 45° or 90° to the previous alignment. In some cases, it may be necessary to rub the revealed regions of the alignment layer 31 at an angle different from that which would have been necessary in the case of a previously unrubbed alignment layer so as to achieve the desired alignment direction. This may be necessary because the original alignment layer may continue to have an effect on the surface energy following the re-rubbing. Thus, a rubbing direction different from the desired alignment orientation by 10° to 20° may be required to correct for the surface energy. The re-rubbed regions are indicated at B.

The remaining photo-resist is then removed, for example by washing with acetone. A retarder layer 39, for instance of the type described hereinbefore with reference to FIG. 13, is then applied by spinning and its optic axis adopts the directions imposed by the underlying parts of the alignment layer 31. The retarder layer 39 is then fixed, for instance by exposure to ultraviolet radiation to form the retarder 40.

What is claimed is:

1. A parallax barrier comprising: a polarisation modifying layer having aperture regions, for supplying light of a second polarisation when receiving light of a first polarisation, separated by barrier regions, for supplying light of a third polarisation different from the second polarisation when receiving light of the first polarisation, at least one of the aperture regions and the barrier regions altering the polarisation of light passing therethrough; and a polariser selectively operable in a first mode to pass light of the second polarisation and to block light of the third polarisation and in a second mode to pass light of the third polarisation.

2. A barrier as claimed in claim 1, wherein the aperture regions comprise parallel elongate slit regions.

3. A barrier as claimed in claim 1, wherein the polariser is a uniform polariser.

4. A barrier as claimed in claim 1, wherein the third polarisation is orthogonal to the second polarisation.

5. A barrier as claimed in claim 1, wherein the first, second and third polarisations are linear polarisations.

6. A barrier as claimed in claim 5, in that the aperture regions are arranged to rotate the polarisation of light and the barrier regions are arranged not to rotate the polarisation of light so that the third polarisation is the same as the first polarisation.

7. A barrier as claimed in claim 6 wherein the aperture regions comprise retarders.

8. A barrier as claimed in claim 7, wherein the aperture regions comprise half wave plates.

9. A barrier as claimed in claim 6, wherein the aperture regions comprise polarisation rotation guides.

10. A barrier as claimed in claim 8, wherein the polarisation modifying layer comprises a half waveplate, the aperture region have optic axes aligned at +45° or −45° to the first polarisation, and the barrier regions have optic axes aligned substantially parallel to the first polarisation.

11. A barrier as claimed in claim 1, wherein the polariser passes light of the second polarisation in the second mode.

12. A barrier as claimed in claim 1, wherein the polariser is removable from a light path through the polarisation modifying layer in the second mode.

13. A barrier as claimed in claim 1, wherein the polariser in the first mode comprises glasses to be worn by an observer.

14. A barrier as claimed in claim 1, wherein the polariser is rotatable through substantially 90° about an axis substantially perpendicular to the polarisation modifying layer between first and second positions for operation in the first and second modes, respectively.

15. A barrier as claimed in claim 1, wherein the polariser comprises a polarising layer and a retarder layer which is switchable between a non-retarding mode and a retarding mode providing a quarter wave of rotation.

16. A barrier as claimed in claim 1, wherein the polariser comprises a polarising layer and a switchable diffuser having a diffusing depolarising mode and a non-diffusing non-depolarising mode.

17. A barrier as claimed in claim 16, wherein the diffuser is disposed between the polarising layer and the polarisation modifying layer.

18. A barrier as claimed in claim 16, wherein the polarisation modifying layer is disposed between the polarising layer and the diffuser.

19. A barrier as claimed in claim 1 further comprising: a first quarter wave plate disposed between the polarisation modifying layer and the polariser and attached to the polarisation modifying layer; and a second quarter wave plate disposed between the first quarter wave plate and the polariser and attached to the polariser, the first and second quarter wave plates having substantially orthogonal optic axes.

20. A barrier as claimed in claim 1, wherein the parallax barrier includes only one patterned waveplate.

21. A barrier as claimed in claim 1, wherein the polarisation modifying layer is a patterned passive waveplate.

22. A barrier as claimed in claim 1, wherein the barrier includes no more than 3 air to material interfaces.

* * * * *